(12) United States Patent
Phillips

(10) Patent No.: US 7,260,551 B2
(45) Date of Patent: Aug. 21, 2007

(54) METHOD FOR PERFORMING A PLURALITY OF CANDIDATE ACTIONS AND MONITORING THE RESPONSES SO AS TO CHOOSE THE NEXT CANDIDATE ACTION TO TAKE TO CONTROL A SYSTEM SO AS TO OPTIMALLY CONTROL ITS OBJECTIVE FUNCTION

(75) Inventor: Alan Paul Rolleston Phillips, Banbury (GB)

(73) Assignee: Omniture, Inc., Orem, UT (US)

( * ) Notice: Subject to any disclaimer, the term of this patent is extended or adjusted under 35 U.S.C. 154(b) by 1059 days.

(21) Appl. No.: 09/814,308

(22) Filed: Mar. 22, 2001

(65) Prior Publication Data

US 2003/0004777 A1    Jan. 2, 2003

(30) Foreign Application Priority Data

Mar. 7, 2001    (GB) ................................. 0105616.7

(51) Int. Cl.
G06F 17/30    (2006.01)
(52) U.S. Cl. ............................................ 705/10; 705/7
(58) Field of Classification Search .................... 705/7, 705/10, 14
See application file for complete search history.

(56) References Cited

U.S. PATENT DOCUMENTS

| | | | | |
|---|---|---|---|---|
| 5,148,365 A | * | 9/1992 | Dembo ...................... | 705/36 R |
| 5,148,637 A |   | 9/1992 | Byron ...................... | 51/165.71 |
| 5,483,278 A |   | 1/1996 | Strubbe et al. ................ | 348/7 |
| 5,737,581 A | * | 4/1998 | Keane ........................... | 703/6 |
| 5,790,407 A | * | 8/1998 | Strickland et al. .......... | 700/169 |
| 5,930,762 A | * | 7/1999 | Masch ........................... | 705/7 |

(Continued)

FOREIGN PATENT DOCUMENTS

WO    WO 98/13776    *    4/1998

(Continued)

OTHER PUBLICATIONS

Avenue A, Inc., www.avenuea.com, Jan. 26, 2001 [retrieved Jan. 18, 2005], pp. 1-21, retrieved from google.com and archive.org.*

(Continued)

Primary Examiner—Tariq R. Hafiz
Assistant Examiner—B. Van Doren
(74) Attorney, Agent, or Firm—Woodcock Washburn LLP

(57) ABSTRACT

The present disclosure relates to a controller for controlling a system, capable of presentation of a plurality of candidate propositions resulting in a response performance, in order to optimise an objective function of the system. The controller has a means for storing, according to candidate proposition, a representation of the response performance in actual use of respective propositions; means for assessing which candidate proposition is likely to result in the lowest expected regret after the next presentation on the basis of an understanding of the probability distribution of the response performance of all of the plurality of candidate propositions; where regret is a term used for the shortfall in response performance between always presenting a true best candidate proposition and using the candidate proposition actually presented.

15 Claims, 25 Drawing Sheets

U.S. PATENT DOCUMENTS

| | | | | |
|---|---|---|---|---|
| 6,032,123 | A * | 2/2000 | Jameson | 705/8 |
| 6,321,212 | B1 * | 11/2001 | Lange | 705/36 R |
| 6,466,894 | B2 * | 10/2002 | Takeuchi et al. | 702/181 |
| 6,684,193 | B1 * | 1/2004 | Chavez et al. | 705/8 |
| 6,839,682 | B1 * | 1/2005 | Blume et al. | 705/10 |
| 6,934,687 | B1 * | 8/2005 | Papierniak et al. | 705/10 |
| 2002/0099600 | A1 * | 7/2002 | Merriman et al. | 705/14 |
| 2002/0111847 | A1 * | 8/2002 | Smith, II | 705/10 |
| 2002/0116236 | A1 * | 8/2002 | Johnson et al. | 705/7 |
| 2002/0128904 | A1 * | 9/2002 | Carruthers et al. | 705/14 |
| 2003/0065603 | A1 * | 4/2003 | Aihara et al. | 705/36 |
| 2003/0144907 | A1 * | 7/2003 | Cohen et al. | 705/14 |

FOREIGN PATENT DOCUMENTS

| | | | |
|---|---|---|---|
| WO | WO98/13776 | * | 4/1998 |
| WO | WO 00/17792 | | 3/2000 |

OTHER PUBLICATIONS

"Taguchi's Loss Function", www.mv.com/ipusers/rm/loss.htm, Feb. 22, 1999 [retrieved Mar. 29, 2006[, pp. 1-5, retrieved from: Google.com and archive.org.*

Faddoul, Nicolas R., et al., "The impact of mixture distributions in classical process capability analysis", IIE Transactions, Dec. 1996 [retrieved Mar. 30, 2006], vol. 28, No. 12, pp. 1-13, retrieved from: Dialog, File 148.*

Gardner, Grant W., et al., "Current Risk in International Portfolios", Journal of Portfolio Management, 1995 [retrieved Mar. 30, 2006], vol. 21, No. 3, pp. 1-10, retrieved from: Dlalog, file 148.*

McClave, James T., et al., "A First Course in Business Statistics", Dellen Publishing, 1983, $2^{nd}$ Edition, pp. 297-301, 316-318, 464-479.*

Pfaffenberger et al., "Statistical Methods", Irwin, Inc., 1981, pp. 687-699 and 703.*

Eppen, Gary D., et al., "Quantitative Concepts for Management", Prentice Hall, 1988, $3^{rd}$ Edition, pp. 502-528.*

* cited by examiner

Proposition
Success or Failure

Set of historical observations

Independent Variable
(Scenario Descriptors)

Dependent Variable
(Responses)

Map this relationship

Figure 18

| Ranked Product | % of Products | Correct Predictions | | | Cumulative Correct Predictions % | | |
|---|---|---|---|---|---|---|---|
| | | Random | Generalised | Targeted | Random | Generalised | Targeted |
| 1 | 4.8 | 92 | 669 | 986 | 5 | 34 | 51 |
| 2 | 9.5 | 92 | 250 | 239 | 10 | 47 | 63 |
| 3 | 14.3 | 92 | 150 | 133 | 14 | 55 | 70 |
| 4 | 19.0 | 92 | 140 | 113 | 19 | 62 | 76 |
| 5 | 23.8 | 92 | 109 | 85 | 24 | 68 | 80 |
| 6 | 28.6 | 92 | 107 | 68 | 29 | 73 | 84 |
| 7 | 33.3 | 92 | 96 | 55 | 33 | 78 | 86 |
| 8 | 38.1 | 92 | 75 | 40 | 38 | 82 | 89 |
| 9 | 42.9 | 92 | 65 | 35 | 43 | 86 | 90 |
| 10 | 47.6 | 92 | 48 | 27 | 48 | 88 | 92 |
| 11 | 52.4 | 92 | 48 | 26 | 52 | 90 | 93 |
| 12 | 57.1 | 92 | 24 | 23 | 57 | 92 | 94 |
| 13 | 61.9 | 92 | 34 | 25 | 62 | 93 | 96 |
| 14 | 66.7 | 92 | 35 | 22 | 67 | 95 | 97 |
| 15 | 71.4 | 92 | 33 | 18 | 71 | 97 | 98 |
| 16 | 76.2 | 92 | 21 | 13 | 76 | 98 | 98 |
| 17 | 81.0 | 92 | 16 | 12 | 81 | 99 | 99 |
| 18 | 85.7 | 92 | 7 | 4 | 86 | 99 | 99 |
| 19 | 90.5 | 92 | 3 | 4 | 90 | 99 | 99 |
| 20 | 95.2 | 92 | 6 | 7 | 95 | 100 | 100 |
| 21 | 100.0 | 92 | 6 | 7 | 100 | 100 | 100 |

Figure 19

| Rank | C-Option ID | Obs. RR | Present'ns | Resp's | Cum.Pres'ns | Cum.Resp's | Cum RR | Index |
|---|---|---|---|---|---|---|---|---|
| 1 | 3791 | 0.046 | 87,329 | 4,005 | 87,329 | 4,005 | 0.04586 | 228 |
| 2 | 4243 | 0.042 | 9,831 | 408 | 97,160 | 4,413 | 0.04542 | 226 |
| 3 | 6902 | 0.034 | 1,420 | 48 | 98,580 | 4,461 | 0.04525 | 225 |
| 4 | 417 | 0.023 | 443 | 10 | 99,023 | 4,471 | 0.04515 | 224 |
| 5 | 9320 | 0.011 | 261 | 3 | 99,284 | 4,474 | 0.04506 | 224 |
| 6 | 1288 | 0.007 | 271 | 2 | 99,555 | 4,476 | 0.04496 | 223 |
| 7 | 1531 | 0.004 | 239 | 1 | 99,794 | 4,477 | 0.04486 | 223 |
| 8 | 39 | 0.000 | 206 | 0 | 100,000 | 4,477 | 0.04477 | 222 |

| Control I - Random Sample | |
|---|---|
| Response Rate | 0.0202 |
| % of Trials | 1.0 |
| Index | 222 |
| Significance | 0.000 |

Figure 20

| Rank | C-Option ID | Obs. RR | Present'ns | Resp's | Cum.Pres'ns | Cum.Resp's | Cum RR | Index |
|---|---|---|---|---|---|---|---|---|
| 1 | 1482 | 0.119 | 27,452 | 3,268 | 27,452 | 3,268 | 0.1190 | 372 |
| 2 | 967 | 0.119 | 21,816 | 2,596 | 49,268 | 5,864 | 0.1190 | 372 |
| 3 | 55 | 0.118 | 16,389 | 1,938 | 65,657 | 7,802 | 0.1188 | 371 |
| 4 | 8312 | 0.111 | 10051 | 1,115 | 75,708 | 8,917 | 0.1178 | 368 |
| 5 | 4446 | 0.109 | 12669 | 1,382 | 88,377 | 10,299 | 0.1165 | 364 |
| 6 | 176 | 0.106 | 2834 | 301 | 91,211 | 10,600 | 0.1162 | 363 |
| 7 | 6688 | 0.083 | 2844 | 237 | 94,055 | 10,837 | 0.1152 | 360 |
| 8 | 4432 | 0.081 | 1930 | 157 | 95,985 | 10,994 | 0.1145 | 358 |
| 9 | 4435 | 0.070 | 2161 | 151 | 98,146 | 11,145 | 0.1136 | 354 |
| 10 | 6588 | 0.066 | 1090 | 72 | 99,236 | 11,217 | 0.1130 | 353 |
| 11 | 1123 | 0.031 | 159 | 5 | 99,395 | 11,222 | 0.1129 | 352 |
| 12 | 2174 | 0.022 | 180 | 4 | 99,575 | 11,226 | 0.1127 | 352 |
| 13 | 8880 | 0.022 | 138 | 3 | 99,713 | 11,229 | 0.1126 | 352 |
| 14 | 1596 | 0.018 | 114 | 2 | 99,827 | 11,231 | 0.1125 | 351 |
| 15 | 1734 | 0.012 | 173 | 2 | 100,000 | 11,233 | 0.1123 | 351 |
|  | Control I - Random Sample | | | | Control II - Generalised Sample | | | |
|  | Response Rate | | 0.032 | | Response Rate | | 0.069 | |
|  | % of Trials | | 1.0 | | % of Trials | | 1.0 | |
|  | Index | | 351 | | Index | | 163 | |
|  | Significance | | 0.000 | | Significance | | 0.001 | |

Figure 21

| Rank | C-Option ID | Obs. RR | Present'ns | Resp's | Cum.Pres'ns | Cum.Resp's | Cum RR | Index |
|---|---|---|---|---|---|---|---|---|
| 1 | 1482 | 0.119 | 27,452 | 3,268 | 27,452 | 3,268 | 0.1190 | 372 |
| 2 | 967 | 0.119 | 21,816 | 2,596 | 49,268 | 5,864 | 0.1190 | 372 |
| 3 | 55 | 0.118 | 16,389 | 1,938 | 65,657 | 7,802 | 0.1188 | 371 |
| 4 | 8312 | 0.111 | 10051 | 1,115 | 75,708 | 8,917 | 0.1178 | 368 |
| 5 | 4446 | 0.109 | 12669 | 1,382 | 88,377 | 10,299 | 0.1165 | 364 |
| 6 | Other | 0.080 | 11623 | 934 | 100,000 | 11,233 | 0.1123 | 351 |
| Control I - Random Sample | | | | | Control II - Generalised Sample | | | |
| Response Rate | | | 0.032 | | Response Rate | | 0.069 | |
| % of Trials | | | 1.0 | | % of Trials | | 1.0 | |
| Index | | | 351 | | Index | | 163 | |
| Significance | | | 0.000 | | Significance | | 0.001 | |

Figure 25

$$controlfraction(1) = \frac{p(1)}{[1+p(1)]} \qquad \text{- Eqn 1.}$$

$$controlfraction(2) = \frac{p(2)}{[1+p(2)]} \qquad \text{- Eqn 2.}$$

If *controlfraction(1)* > *upperlimit(1)* then
    *controlfraction(1)* = *upperlimit(1)*
Elseif *controlfraction(1)* < *lowerlimit(1)* or *p(1)* < *useralpha* then
    *controlfraction(1)* = *lowerlimit(1)*
End if If *controlfraction(2)* > *upperlimit(2)* then
    *controlfraction(2)* = *upperlimit(2)*
Elseif *controlfraction(2)* < *lowerlimit(2)* or *p(2)* < *useralpha* then
    *controlfraction(2)* = *lowerlimit(2)*
End if

*tempstore* = *Rnd*     (where *Rnd* is a random number, 0 <= *Rnd* <= 1)

If *tempstore*<*controlfraction(1)* then
    *presentationsubsystem* = 1
Elseif *tempstore* >= *controlfraction(1)* And
                  *tempstore* < [*controlfraction(1)* + *controlfraction(2)*] then
    *presentationsubsystem* = 2
Else
    *presentationsubsystem* = 3
End If Note that *upperlimits* of the *controlfractions* in the case
of two control groups might normally not be expected
to exceed 0.33 (as there are three groups being
controlled including the reference group)

METHOD FOR PERFORMING A PLURALITY OF CANDIDATE ACTIONS AND MONITORING THE RESPONSES SO AS TO CHOOSE THE NEXT CANDIDATE ACTION TO TAKE TO CONTROL A SYSTEM SO AS TO OPTIMALLY CONTROL ITS OBJECTIVE FUNCTION

BACKGROUND OF THE INVENTION

1. Field of the Invention

The present invention relates to a controller for controlling a system, having a plurality of candidate propositions or functions which result in a response, with the intention of optimising an objective function of the system. In particular, the present invention relates to controllers for systems presenting marketing propositions on the Internet, but is not limited thereto.

2. Description of Related Art

The last ten years has seen the development and rapid expansion of a technology sector known as Customer Relationship Management (CRM). This technology relates to hardware, software, and business practices designed to facilitate all aspects of the acquisition, servicing and retention of customers by a business.

One aspect of this technology involves using and applying business intelligence to develop software solutions for automating some of the processes involved in managing customer relationships. The resultant software solution can be applied wherever there is a vendor and a purchaser, i.e. to both business-to-private consumer relationships, and business-to-business relationships. Moreover, these solutions can be deployed in particular configurations to support CRM activities in different types of customer channel. For example, CRM technology can be used to control and manage the interactions with customers through telephone call-centres (inbound and outbound), Internet web sites, electronic kiosks, email and direct mail.

One of the principal functions of a CRM software solution is to maximize the efficiency of exchanges with customers. The first requirement for maximizing the efficiency of any particular business interface is to define a specific efficiency metric, success metric, or objective function, which is to be optimized. Typically this objective function relates to the monetary gains achieved by the interface, but is not limited thereto. It could for example relate to the minimization of customer attrition from the entry page of a web-site, or the maximisation of policy renewals for an insurance company using call centre support activities. In addition, the metric could be a binary response/non-response measurement or some other ordinal measure. The term objective function will be employed herein to encompass all such metrics.

For the sake of clarity only, the remainder of this specification will be based on systems which are designed to maximize either the number of purchase responses or the monetary responses from customers.

As an example, a web site retails fifty different products. There are therefore a plurality of different candidate propositions that are available for presentation to the visiting customer, the content of those propositions can be predetermined and the selection of the proposition to be presented is controlled according to a campaign controller. The candidate proposition is in effect a marketing proposition for the product in question.

When a customer visits the web site, an interaction event occurs in that a candidate proposition (marketing proposition) is presented to the customer (for example by display) according to the particular interaction scenario occurring between the customer and the web site and proposition. The response behaviour of the customer to the marketing proposition, and hence the response performance of the proposition, will vary according to a variety of factors.

FIG. 1 illustrates the principal data vectors that may influence the response behaviour of a customer to a particular candidate proposition or marketing proposition during an interaction event. In each case, examples of the field types that might characterise the vector are given.

A Product/Service Data Vector may contain fields which describe characteristics of the product which is the subject of the marketing proposition, such as size, colour, class, and a unique product reference number, although others may clearly be employed.

A Positioning Data Vector may contain information about the way in which the marketing proposition was delivered, for example, the message target age group, price point used and so on.

A Customer Data Vector may contain a number of explicit data fields which have been captured directly from the customer, such as the method of payment, address, gender and a number of summarized or composite fields which are thought to discriminate this customer from others. The vector may also contain data fields which represent inferred characteristics based upon previously observed behaviour of the customer. The summarized or composite fields can include fields such as the total value of purchases to date, the frequency of visits of the customer, and the date of last visit. Collectively this Customer Data Vector is sometimes known as a customer profile.

An Environment Vector may contain descriptors of the context of the marketing proposition, for example, the marketing channel used, the time of day, the subject context in which the proposition was placed, although others may be used.

The objective of the campaign controller is to select the candidate proposition to be presented which is predicted to optimise the objective function that can occur during the interaction event, that is to say produce a response performance or response value which produces the most success according to the selected metric, typically maximising the monetary response from the customer. This is the optimal solution. If one knew everything that could ever be known, then this optimal solution would be provided by the true best candidate proposition. In reality, the objective can be met to a degree by evaluating what the most likely next purchase may be for each customer visiting to the site, based on everything that they have done up to the present moment.

For the campaign controller to have the opportunity of exploiting relationships observed in historical interactions, data which characterizes the interaction event must be logged for each customer interaction. Each interaction event produces an interaction record containing a set of independent variable descriptors of the interaction event plus the response value which was stimulated by the marketing proposition presented. After a number of customers have visited the web site, a data set of such interaction records is produced and it then becomes possible to identify the relationships between specific conditions of the interaction event and the probability of a specific response value or outcome.

The identification and mapping of these significant relationships, as shown in FIG. 2, is sometimes performed within a mathematical or statistical framework (Data Mining, Mathematical Modelling, Statistical Modelling, Regression Modelling, Decision Tree Modelling and Neural Network Training are terms that are applied to this type of activity). Sometimes no explicit mapping takes place, instead the data records are arranged in a special format (usually a matrix) and are stored as exemplar "cases" (terms used to describe this approach are often Collaborative Filtering, Case Based Reasoning and Value Difference Metric, though there are many other names give to specific variants of this approach) Clustering is a method that could also be placed in this group as it is a method of storing aggregations of exemplars. These exemplar cases are then used as references for future expected outcomes.

The general purpose of all approaches is to use observations of previous interaction events to discriminate the likely outcome of new interaction events such that marketing propositions with a high expected outcome of success can be preferentially presented to customers. Over a period of time, the consistent preferential presenting of marketing propositions with higher expectation response values delivers a cumulative commercial benefit.

The choice of the modelling method typically depends on such things as:

The number of different types of response values that need to be modelled;

The computer processing time available for building the model;

The computer processing time available for making predictions based upon the model;

The importance of robustness versus accuracy;

The need for temporal stability in an on-line application;

The simplicity of adaptation of the method for the problem at hand.

The two general approaches of learning from historical observations of interaction events are described briefly below with their principal strengths and weaknesses:

Collaborative Filtering

Advantages:

New observations of events can be formatted and incorporated into the collaborative filter model quickly, and in real time for on-line applications;

A single model can predict expected outcomes for many different response types (i.e. many different dependent variables may be accommodated by one model);

Very robust model.

Weaknesses:

The predictive outcomes are not generally as accurate as those derived from a mathematical regression model which has been built to maximize its discriminatory power with respect to a single dependent variable;

Generally slow when making a prediction for a new interaction event;

The predictions cannot easily be expressed as probabilities or expectation values with any specific statistical confidence.

Regression Modelling, Statistical Modelling, Neural Networks and Related

Advantages:

Generally regarded as the most accurate way to map the relationship between a number of independent variables and a dependent variable, given a set of exemplars;

Generally faster when making a prediction for a new interaction event than collaborative filters (dependent upon the precise model type);

Can provide expectation response values with specific statistical confidences, and in the case of binary response variables can provide the probability of a positive response (only some model types);

Work best when there is only one dependent variable per model.

Weaknesses:

Can be slow in model build mode relative to collaborative filter models;

There are other notable weaknesses which arise from the way in which mathematical models are used in known CRM campaign controllers.

Both methods also suffer from two disadvantages for on-line applications:

1. They replicate instances of previously observed history and therefore have no way of accommodating new propositions/offers in their decision process (as such propositions/offers are not present in the historical data).

2. By way of reproducing history they are only capable of passive learning.

There are other notable weaknesses which arise from the way which mathematical models are used in known CRM campaign controllers:

1. Given a particular set of input conditions (a particular set of interaction data descriptors) the systems will always present the same candidate proposition. This can make the content of the marketing proposition presented appear rather dull and lifeless to customers.

2. The erosion of the predictive relevance of historical observations resulting from temporal changes in market conditions is not controlled in an optimal manner (i.e. it is likely that observations which were made at earlier times will be less indicative of the prevailing market conditions than more recent observations. This temporal erosion of relevance would ideally be a managed feature of an automated CRM system.

3. Current systems do not explicitly measure their commercial benefit in terms of easily understood marketing metrics.

Considering again the example of the web site retailing fifty different products, a preliminary analysis of a data set of historical interaction records reveals a product sales distribution like that shown in FIG. 6. This distribution is a function of two main influences, firstly the true product demand and secondly the relative prominence or promotional effort that has been made for each specific product.

For example, products 48, 49 and 50 exhibited zero sales during the period. If these product transactions were used as the basis for building predictive models then products 48, 49 and 50 would never be recommended for presenting to customers as they have exhibited zero sales in the past. However, the zero sales may in fact be a very poor representation of the relative potential of each product. For example, it may be that products 48, 49 and 50 were never presented at any time to the customers visiting the site whilst products 1, 2 and 3 were very heavily promoted. It may also be that the prominence of the promotions, and general representation of products 48, 49 and 50 had been historically much lower than that of the leading sales products.

If behavioural models are based around this set of data and then used as a basis for controlling the presenting of the web page marketing propositions, then two things would happen 1. Products 48, 49 and 50 would never be presented to customers (never be selected for promotion).
2. The number of times of presenting those products which customers have historically responded to least favourably would become even less likely to be selected for presenting in the future.

This would be a highly non-optimal solution. For example, it may be that products 48, 49 and 50 are the products in true highest demand but because they have been presented so few times then it is by statistical chance that they have exhibited zero purchases. In current CRM systems, products which are observed to have the highest response rates under a particular set of input conditions are always presented in the future under those same conditions. This prevents the system from being able to improve its estimates of the true product demand, or to adapt to changes in the market conditions. The web site also becomes dull and lacks variation in the content for a particular user, and the available statistics from which conclusions may be drawn about weaker performing products become even fewer, further reducing the confidence in what may already be weak hypotheses based on sparse historical observations.

In a case where the site has a large number of potential products to present then the efficiency with which each product is tested and presented becomes of significant commercial importance. The requirement for high testing efficiency is further exaggerated in markets which exhibit temporal variations in preferences, since the response rates with respect to specific marketing propositions will need constant reappraisal. Markets can change as a result of seasonal effects, the "ageing" of content, actions and reactions from competitors offering similar products in the market place, and other reasons.

The CRM implementations described also do not efficiently manage the introduction of new products or marketing propositions. Since new products do not appear in the historical data set then these systems cannot naturally accommodate them. Marketers may force testing of new products by requiring a minimum number of presentations but this is non-optimal and can be expensive. It can also be labour-intensive to manage where the product/offer portfolio is dynamic.

In the case of regression models, the same effect of tending to reinforce and propagate historical uncertainties manifests itself with respect to independent variables. Consider an example, illustrated in FIG. 7, where a particular product offer is found to be most effective at a certain time of day. Suppose also that other products are found to exhibit higher response rates outside the window shown between lines A and B.

In the situation described by FIG. 7, a regression modelling system using historical observations as the basis for optimizing the presentation of future marketing propositions will exclusively present propositions relating to this specific product inside the time window A-B. This means that in the future, little or no data about the response behaviour to marketing proposition for this product will be available outside the time window. In the short term as a method of increasing the average response rate by presenting customers with the right marketing proposition at the right time, the system is successful. However, in the absence of a control mechanism which ensures adequate ongoing exploration, then the ability of this system to maintain confidence and track possible changes in the locations of the optimum operating points will be compromised, that is to say, the system does not operate with a sustainably optimal solution.

One known method of enhancing the sustainability is to seed the activities of the system with a certain level of randomness by forcing the system, from time-to-time, to make a random choice whereby there is a specific low level of ongoing exploratory activity. If the level of exploratory activity could be set at the right level, this method would permit temporal stability, but there is a problem with determining what this right level of ongoing exploration is such that the system will remain confident that it is tracking the optimum solution whilst minimizing the cost of the suboptimal exploratory activities.

BRIEF SUMMARY OF THE INVENTION

An object of the present invention is to provide a controller for controlling a system, capable of presentation of a plurality of candidate propositions resulting in a response performance, in order to optimise an objective function of the system and in a manner which is less susceptible to the drawbacks mentioned above.

According to the present invention there is provided a controller for controlling a system, capable of presentation of a plurality of candidate propositions resulting in a response performance, in order to optimise an objective function of the system, the controller comprising:

means for storing, according to candidate proposition, a representation of the response performance in actual use of respective propositions;

means for assessing which candidate proposition is likely to result in the lowest expected regret after the next presentation on the basis of an understanding of the probability distribution of the response performance of all of the plurality of candidate propositions;

where regret is a term used for the shortfall in response performance between always presenting the true best candidate proposition and using the candidate proposition actually presented.

In this way, an automated control is provided which actively learns whilst always conducting a certain amount of testing. With this approach to on-line learning, the controller not only exploits historical relationships but also explicitly manages the risk of losses which result from making non-optimal decisions on the basis of limited observations. The new approach is particularly well suited to the on-line optimization activities involved in dynamically managing business-to-customer interfaces. In particular, the present invention provides a full multivariate solution (in a Bayesian framework) where the interaction environment is characterized by a number of descriptors which have an observable influence on the response behaviour.

BRIEF DESCRIPTION OF THE DRAWINGS

Examples of the present invention will now be described with reference to the accompanying drawings, in which

FIG. 18 illustrates a chart showing efficient gains resulting from generalised gains and targeted gains;

FIG. 19 illustrates an example of a campaign performance chart for a basic configuration;

FIG. 20 illustrates an example of a campaign performance chart for a basic configuration and targeted configuration;

FIG. 21 is a compact form of FIG. 20 where only the top five propositions with the highest response rates are individually identified;

FIG. 25 shows the decision process of FIG. 24 described by a pseudo-code.

DETAILED DESCRIPTION OF THE INVENTION

Figure 1:
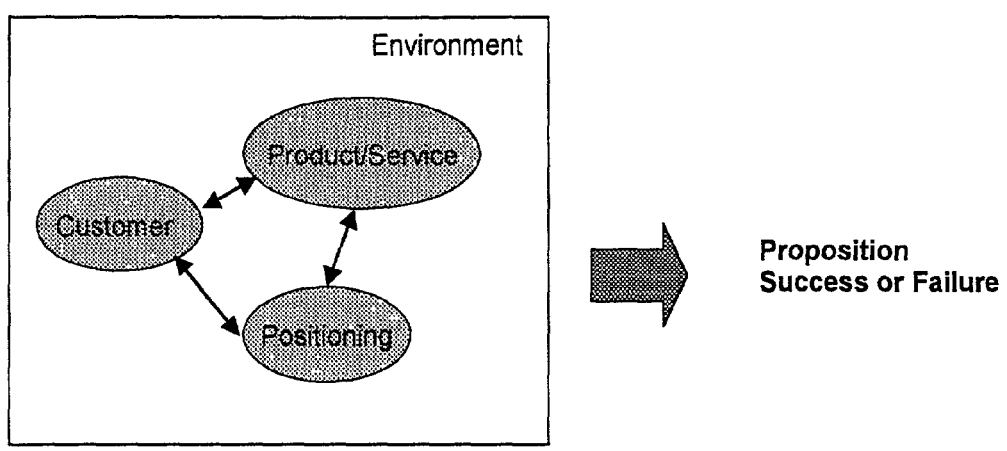
FIG. 1 illustrates the principal data vectors that may influence the response behaviour of a customer to a particular candidate proposition during an interaction event.
Figure 2:
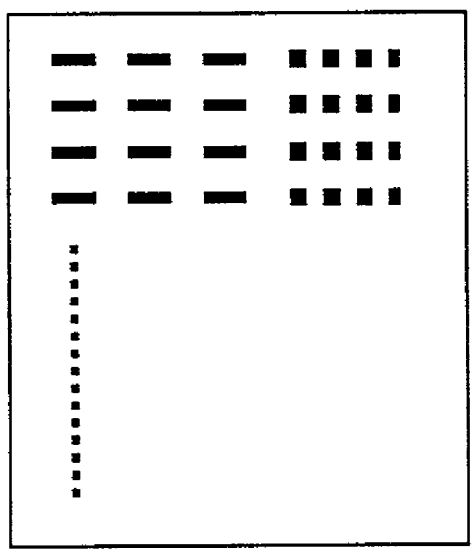
FIG. 2 illustrates the identification and mapping of significant historical relationships to model expected response behaviour.
Figure 2:
Figure 2:
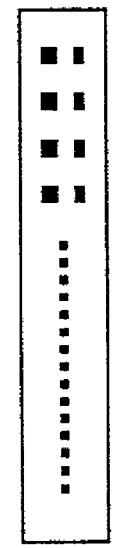
Figure 3:
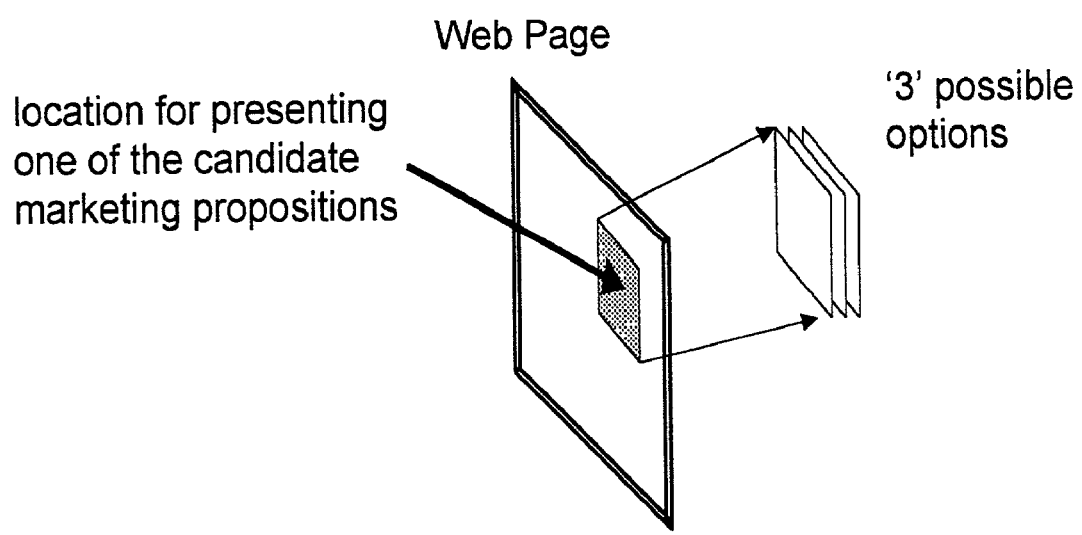
FIG. 3 illustrates schematically a location on a web page having three marketing propositions.

To assist in understanding the way in which the present invention operates, reference is made to the example shown in FIG. 3. The figure shows a location on a web-page for which there are three candidate propositions, any of which can be presented. Each proposition is an "active" proposition in that a visitor to the web page may click directly on the proposition should they feel inclined. For the purpose of illustration, suppose that the objective of the controller of the system is to stimulate the maximum number of interactions (in this case "click-throughs") on the presented proposition, and that there is initially no information available to characterize each proposition. Assume also that there is no data available about the web site visitors so they must all be treated as identical.

The problem for the campaign controller of the system is to test each proposition in turn and to learn as efficiently as possible which proposition has the highest overall response rate, and to preferentially present this proposition. By preferentially presenting the proposition which has exhibited the highest response rate to date then the control system might be expected to achieve a high overall response performance.

After a number of presentations the control system may have observed that a particular proposition has performed best. However, because of the limited number of observations, the proposition which has been observed to perform best so far may not be the true best. i.e. there is a risk that because of the limited number of trials or interaction events, the observed best is not the true best. Thus, by locking onto this proposition, and preferentially presenting it from this point onwards, a large number of potential responses may be lost.

Figure 4:
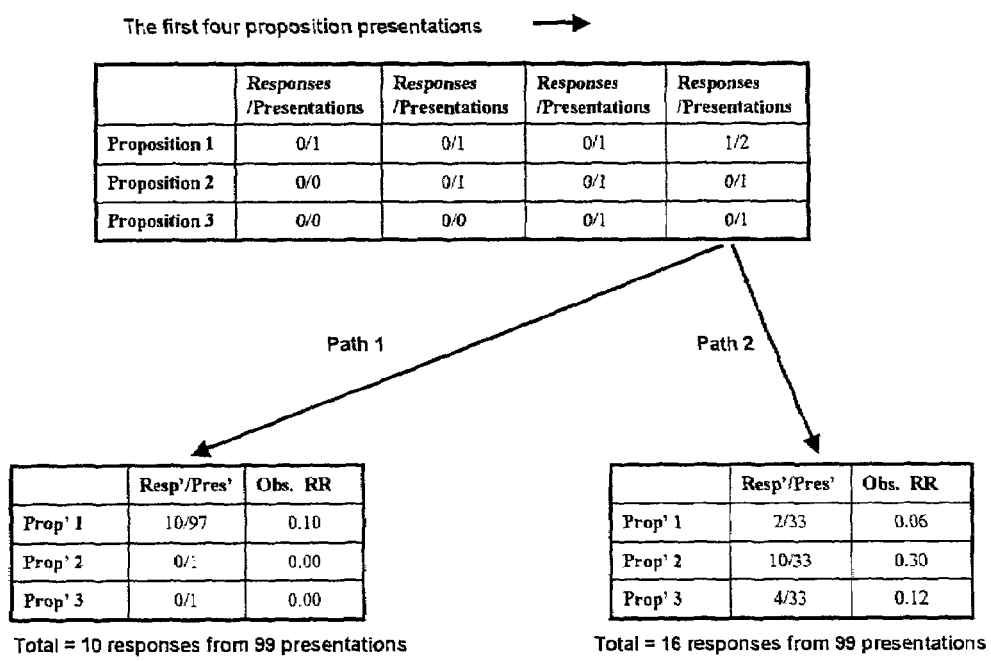
FIG. 4 shows fictitious data for the presentation of three candidate propositions and data for the evolution of the subsequent presentation of the propositions for two different paths.

FIG. 4 shows how the testing of the three propositions might take place from the first proposition presentation. The actual data shown are fictitious and serve only as an example to illustrate the problem.

At the start the control system has no information and perhaps presents each proposition once. After three displays, each proposition has been presented once (say) and each time there was no response. Not having any information which discriminates the performance of the propositions perhaps a good system might then go back and present each proposition again until such time as some evidence of the response performance of one or more of the propositions was exposed. In the example, on the fourth presentation, proposition 1 was presented and this time a positive response was recorded. The control system now has information which discriminates, to a small degree, the relative performances of the three candidate propositions. As illustrated, two possible paths from this point are shown for the evolution of the subsequent presentation of the propositions. The two paths shown represent the two possible extremes.

Path 1 represents a campaign controller which interprets the response to proposition 1 as sufficient evidence upon which to determine that proposition 1 is the best, and therefore presents this proposition from this point onwards. Path 2 represents a campaign controller which interprets the observed responses up to the fourth presentation, and also all responses observed over the following ninety-five proposition presentations, as statistically unsafe. Thus, the controller represented by Path 2 continues to present each candidate proposition with equal frequency over the first ninety-nine presentations. Paths 1 and 2 represent two extremes. In the example Path 1 resulted in a total of ten positive responses (click-throughs) and Path 2 resulted in sixteen positive responses.

An examination of the example data in FIG. 4 shows that the response rates of the three candidate propositions were observed to have been approximately 0.1, 0.3 and 0.1 respectively, over the first ninety-nine presentations. Because of the small number of presentations the different paths exhibited some statistical variation in observed response rate across the ninety-nine presentations. For example Path 2 found proposition 1 to exhibit an overall observed response rate ("Obs.RR") of 0.06 whilst Path 1 found the same proposition to have an observed response rate of 0.1. This statistical variation in observed response rate is a fundamental characteristic of the problem.

It can be appreciated that ideally there should be a presentation path somewhere between Paths 1 and 2 which would, on average, produce superior overall response performance. A controller might be able to do this by evaluating the risk associated with continuing to display the proposition which has exhibited the highest response rate to date, versus the possible gains that might result from continuing to explore the other two propositions to be more confident that the true best has been found.

Figure 5:
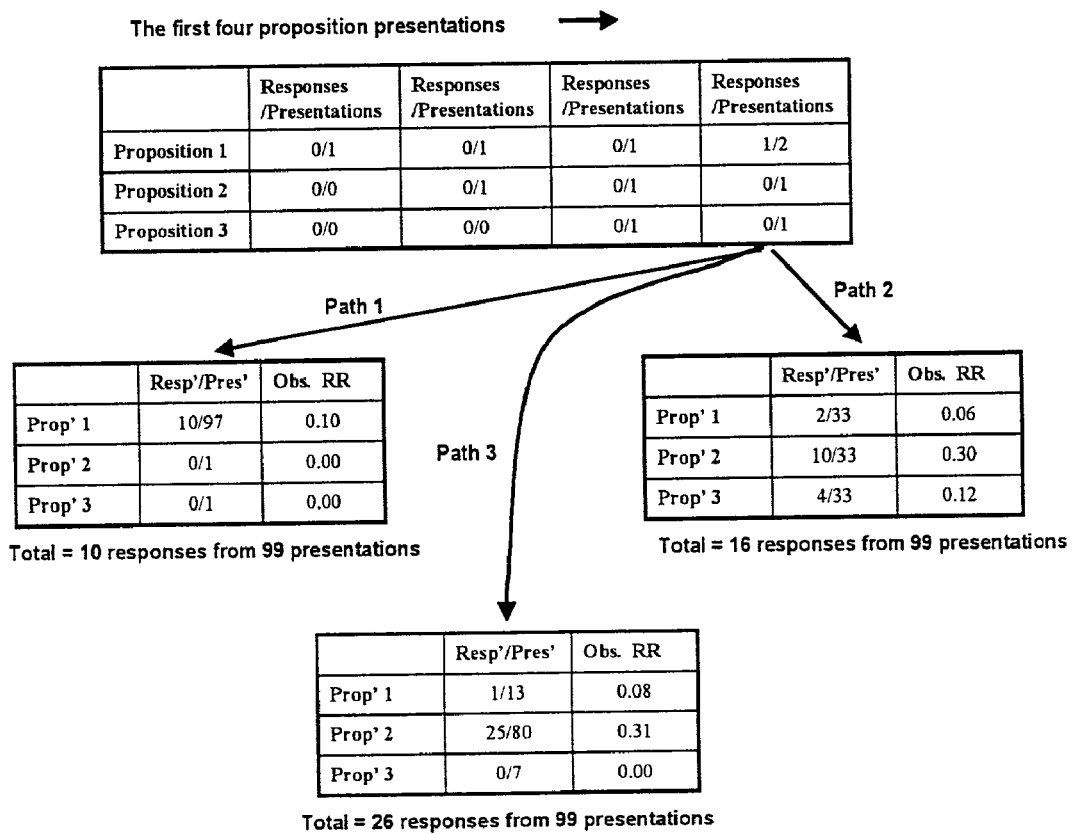
FIG. 5 shows the data of FIG. 4 with data for the evolution of the subsequent presentation of the propositions for an additional path.
Figure 6:
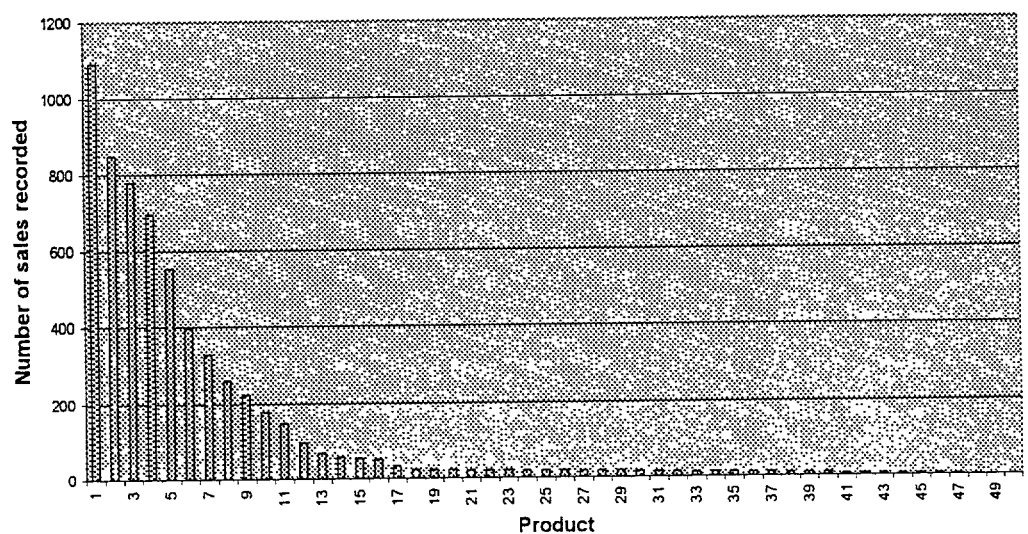
FIG. 6 illustrates a data set of historical interaction records-for a web site retailing fifty different products.
Figure 7:
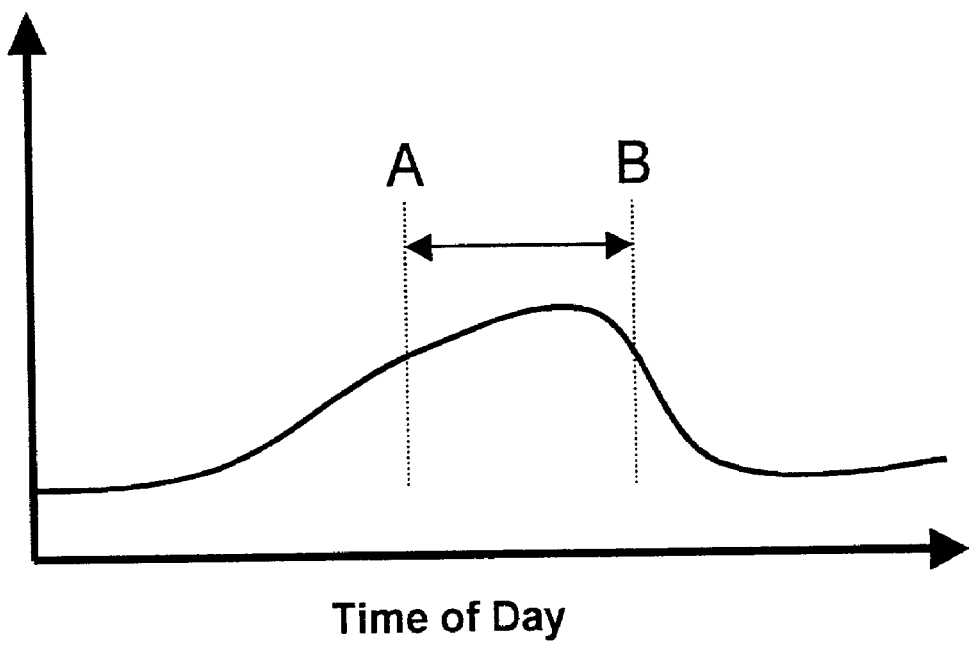
FIG. 7 shows a graph illustrating an example of response rate versus time of day.

The presentation sequence shown by Path 3 in FIG. 5 could represent such an optimal path. Path 3 delivered twenty-five positive responses in the same number of presentations and evidently much better satisfied the objective of maximizing the overall response rate. It was able to do this by continuously evaluating which proposition should be presented next in order to maximize the confidence in achieving the highest overall response rate across the trials. The presentation decision being based each time upon all observation information available at that moment.

The present invention therefore relates to a controller where:
1. the intention is to optimize a predefined objective function in a sustainable way (consistently over time).
2. where decisions will be made or actions taken, based upon previous observations.
3. where the expected outcome resulting from the next decision or action cannot be perfectly predicted from the information available (for example the outcome may be stochastic in nature, or there may be components of the outcome which cannot be perfectly predicted as they are dependent upon pieces of information which are not available).
4. future decisions or actions made by the controller also affect the new information that will become available.

Figure 8:
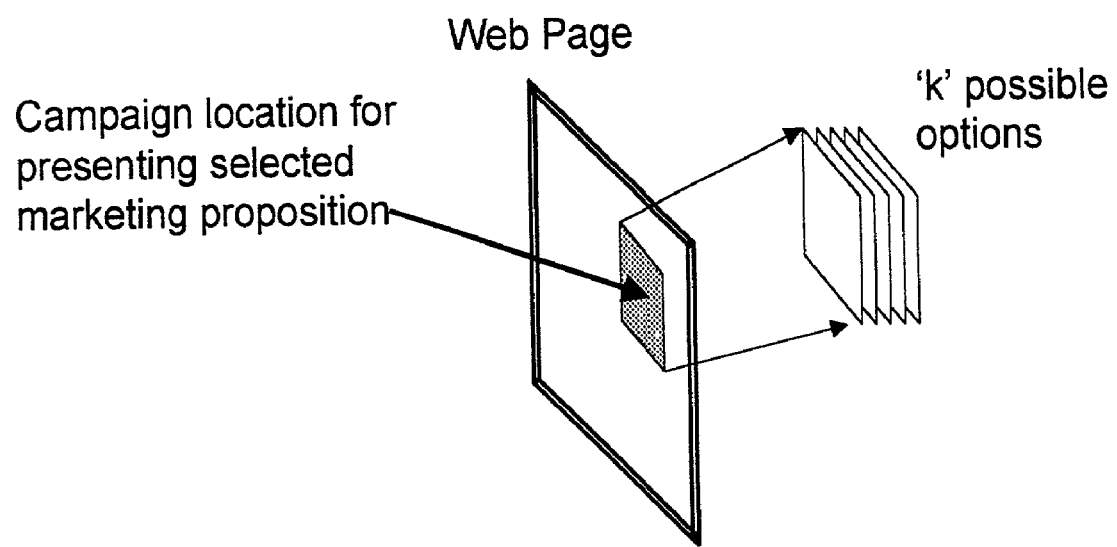
FIG. 8 illustrates schematically a location on a web page having "k" possible marketing propositions which need to be optimised to achieve a maximum overall response rate.

Referring now to FIG. 8, which is a more generalised version of FIG. 3, a web page is illustrated where a marketing proposition is to be presented at a predetermined location thereon. A campaign controller of the present invention has the objective of maximizing the overall response rate to the presentations over time. In this respect, the controller must select one of 'k' possible marketing propositions for presentation in the particular location with the intention of obtaining the highest expected response values.

The configuration of this problem is kept simple by assuming that there is no information available to the controller except an identifier of the marketing proposition that is presented and whether or not the response value of the customer thereto is positive. This configuration is referred to as the "basic campaign configuration" because there are no independent variable descriptors being captured which characterise the interaction scenario and which might yield additional predictive benefit to the controller.

To maximize the overall response rate, the controller must over time conduct an assessment of all of the propositions such that the controller remains confident that the current best observed marketing proposition is really the true best otherwise there will clearly be a price to pay if the controller incorrectly assumes that one proposition is the best performing one when in fact the true best performing proposition is another. This can only be discovered through more testing.

The mathematics that form the basis of the function of the controller of the present invention is fully specified in Appendix I. In effect, the controller assesses which candidate proposition is likely to result in the lowest expected regret after the next presentation on the basis of an understanding of the probability distribution of the response performance of all of the available candidate propositions. In this respect, the term regret is used to express the shortfall in response performance between always presenting the true best candidate proposition and using the candidate proposition actually presented.

In one solution, it is assumed that the option which is likely to result in the lowest expected regret is assessed on the basis of the current or best candidate proposition, which in effect has the mean of the probability distribution.

It will be appreciated that the controller of the present invention can be applied to systems in a wide variety of different technical areas with the intention of optimising an objective function of the system. There now follows, by way of example only, illustrations of applications of the present invention.

One way of looking at the present invention is to consider the following expression of the expected regret:

e[REGRET]=e[COST]+e[LOSS]

the intention being to try to keep the expected regret low by balancing e[COST] and e[LOSS]

where COST=not realized reward due to exploration trails (when a non-optimal option or presentation is tried because we are not sufficiently sure that the best looking proposition is actually best)

and LOSS=not realized reward due to missing the best option when we do not do enough exploration so that we are mislead by an inferior option which looks better that the best option).

Controlled Least-cost Testing

The preparation of marketing creative materials can be expensive. Therefore, before a candidate proposition is withdrawn, marketers would like to have a minimum assurance that the candidate proposition is not performing. The simplest way to manage this is just to force each proposition to be presented a minimum number of times.

An alternative is to ensure that each proposition is presented a minimum number of times per 100, 1000, or 10,000 presentations for example. This can be done by adding a decision step in the controller which checks that each proposition has been presented the minimum number of times in the previous 100, 1000, or 10,000 presentation interaction records. Propositions which are below the required minimum can then be selected directly with the regular computation to find the best proposition for presentation being by-passed.

It can also be that it is desired to accelerate the testing over a relatively short period of time, and/or to stimulate higher levels of testing over a fixed period. A convenient way to achieve this is to define a fixed width sliding window within which observations are used in the decision process, and outside which they are rejected. If the sliding window is defined in terms of a fixed number of most recent observations or a fixed elapsed time, then observations which have aged to a point outside the window will be ignored for the purposes of computing the next proposition for presentation. This has the effect of exaggerating the level of ongoing testing as the confidences in the observed mean response rates (and also the coefficients of the multivariate model, should there be any) will be lower. See FIG. 9 for an example of a sliding window outside which older observations are rejected.

At the end of the accelerated test period an analysis may then be conducted on all of the historical records acquired over the entire test period. This analysis is then used as the basis for determining if specific propositions are performing better than others.

Automated Selection of an Optimal Function For A System Having Many Candidate Functions Such That The overall System Objective is Best Satisfied In this case, the system has a plurality of candidate functions. These may be considered in the same manner as candidate propositions. Thus, the controller intends to make the most efficient use of the candidate functions from a portfolio of possible functions in order to optimise a given overall objective function.

The controller of the present invention using the mathematics of Appendix 1 can manage the exploration-exploitation balance such that the overall performance satisfies an objective function in an optimal way. This principle of optimization can also be powerfully applied at a relatively higher level to control relatively lower level systems.

type) of weight decay factor to historical records, two historical weighting functions are given below: example:

$$\frac{1}{e^{kt}} \text{ or } \frac{1}{t^k}$$

where k is a constant which controls the rate of decay, and t is the elapsed time since the observation was made. Alternatively t could be the number of observations which have elapsed since the present time.

Applying weighting functions similar to those above can be computationally expensive. It can be less expensive to apply a fixed temporal depreciation factor periodically to all observations and responses. For example a factor "TD" (where 0<=TD<=1) applied after each thousand new observations has the effect of weighting observations as shown in the Table 1. Such a factor of between zero and unity can be applied periodically where the period is defined in terms of a fixed number of new observations or a fixed time period.

TABLE 1

| Elapsed observations | 1000 | 2000 | 3000 | 4000 | 5000 | 6000 | 7000 |
|---|---|---|---|---|---|---|---|
| Observations in period | 1000 | 1000 | 1000 | 1000 | 1000 | 1000 | 1000 |
| Weighting factor applied | TD | TD^2 | TD^3 | TD^4 | TD^5 | TD^6 | TD^7 |
| Weight if TD = 0.9 | 0.9 | 0.81 | 0.73 | 0.66 | 0.59 | 0.53 | 0.48 |
| Weighted observations | 900 | 810 | 729 | 656 | 590 | 531 | 478 |
| Total weight of observations | 900 | 1710 | 2439 | 3095 | 3686 | 4217 | 4695 |

By way of example, the controller can be applied to the explicit management of temporal variation in the response behaviour of customers to a marketing proposition in an online environment.

One of the complexities of maintaining an optimal CRM system is the time varying nature of the response behaviour which results from the market place not being static, seasonal variations, and because competitive interaction effects and marketing propositions/product offerings are subject to ageing. This means that more recent observations of interaction events are likely to be more relevant to the prevailing conditions that older observations. Thus, in general, the predictive power of the known response behaviour models based upon historical observations becomes eroded over time.

For a self-regulating system to remain optimal it must have a mechanism for attaching relatively more weight to recent observations and less weight to older observations.

Figure 9:
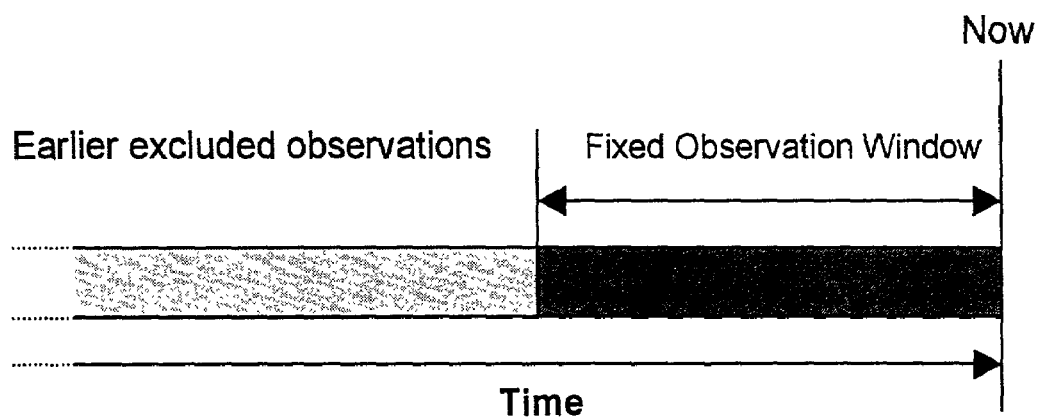
FIG. 9 illustrates a sliding window outside which older observations are rejected.

There are a number of schemes by which more recent observations may be given higher weight. One is to simply exclude observations which were made more than some fixed elapsed time before the present time. This defines a sliding window within which observations are used in the modelling and predictive process, and outside which all observations are excluded. Such a sliding window might also be defined in terms of a fixed number of observations such that there are always a fixed number of the most recent observations available for analysis inside the window. FIG. 9 is a schematic representation of a sliding window.

An alternative method of reducing the weight of older observations is to apply a temporal depreciation factor or weighting function which applies an exponential (or other In the example depreciation schedule, after each set of 1000 observations a fixed depreciation factor is applied. The effect is to progressively depreciate the weight of historical observations by a fixed factor after each period. The objective of the controller is to provide a self-regulating application of the temporal depreciation schedule which maximizes the objective function of the system(usually response performance). A controller can therefore assess as above using a representation of the response performance which is temporally depreciated.

However, as shown in the example weighting functions above, there are a number of different depreciation schedules. Due to the nature of the problem, there is no easy method by which an "ideal" temporal depreciation schedule can be identified or estimated for CRM applications without some experimentation.

One solution based on experimentation is to have several independent sub-systems running in parallel, each one applying a different candidate temporal depreciation schedule. The respective performances can then be continuously appraised with respect to the objective function, and after a defined period of time, the best performing sub-system can be identified. The temporal depreciation schedule of the best performing sub-system can then be adopted as the basis for applying temporal depreciation from that point in time onwards.

Figure 10:
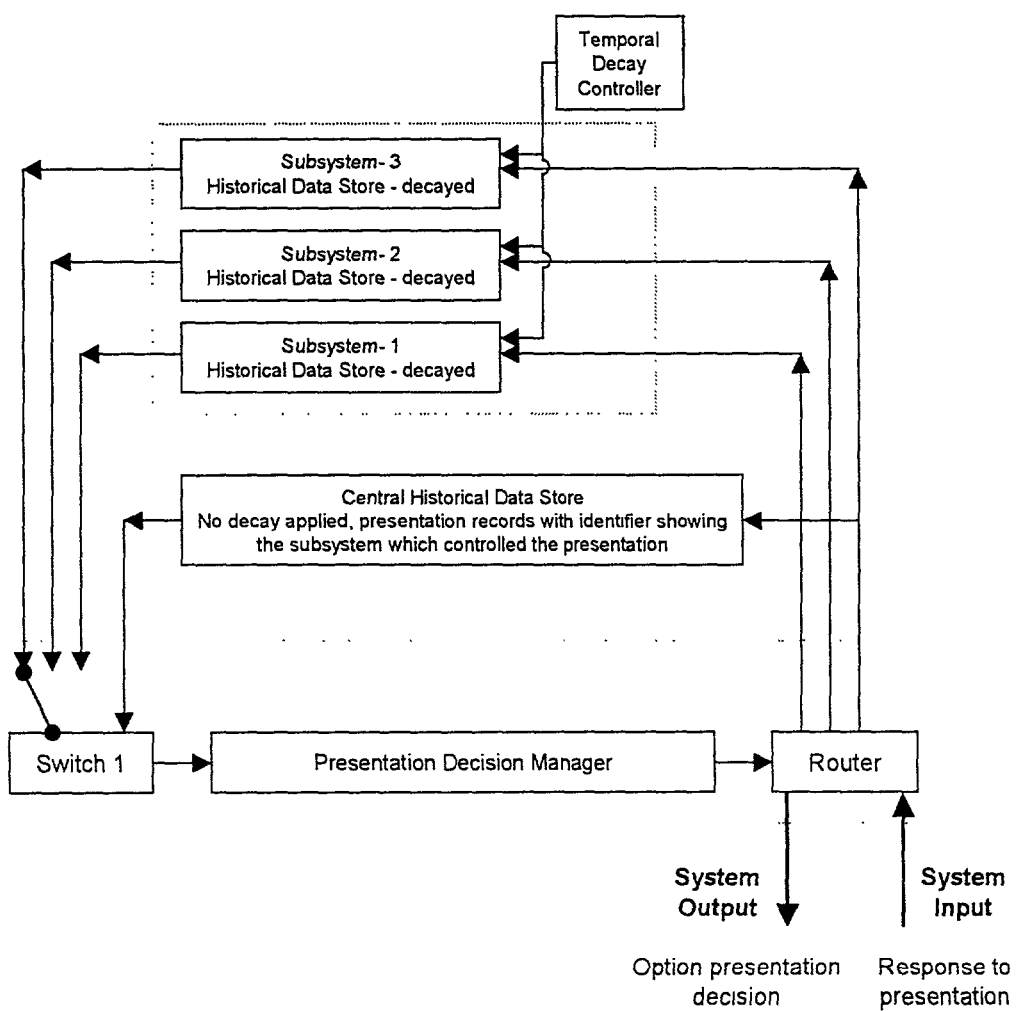
FIG. 10 illustrates a system made up of three sub-systems which each depreciate the value of historical interaction records at a different rate.

FIG. 10 is a schematic representation of a system which contains three sub-systems. Each sub-system shares a common Presentation Decision Manager which uses previous observations as the basis for deciding which option should be presented next in order to maximize the objective function. But each sub-system operates with a different temporal depreciation schedule. The actual algorithm used to control the presentation decision process is not important for the purposes of explaining how the temporal depreciation optimization takes place, but as an example, it could use the cost-gain algorithms described in Appendix I of this document.

Referring to FIG. 10, switch 1 is used to connect the depreciated observation records held within the Historical Data Store of a particular sub-system to the Presentation Decision Manager. If a particular sub-system is selected by the switch to control the next proposition presentation, it uses all the historical presentation and response interaction records from previous controls by that sub-system, temporally depreciated according to the particular temporal depreciation schedule of that sub-system, in order to make its selection decision. The Router then routes the presentation information and the response value associated with that selection, to the data store which belongs to the sub-system which controlled the presentation. The data in the sub-system Historical Data Stores are periodically depreciated according to the respective temporal decay schedule of the sub-system in question.

A copy of all historical interaction record data is maintained in a central store (Central Historical Data Store) with no temporal depreciation applied. Each record is flagged with an attribute which indicates which sub-system controlled each particular presentation event.

If the undepreciated records attributable to one sub-system having the particular temporal depreciation schedule are examined with respect to the desired objective function, it is possible to compare the performance of that sub-system with the performance of any of the other sub-systems. It will be appreciated that by using the undepreciated interaction records from the Central Historical Data Store then this performance analysis is independent of the actual temporal depreciation schedule. This comparison may be made over a fixed period of historical time, a fixed number of records or over all historical records in the store. Evidently by examining the overall response performance of presentations controlled by each sub-system data set permits a direct comparison of the relative performances attributable to each temporal depreciation schedule. The system could, after a defined number of test cycles determine which sub-system had exhibited the overall maximum response performance during the period. The temporal depreciation schedule of this sub-system could then be adopted as offering the best temporal depreciation schedule. This could be effected by locking Switch 1 such that the best performing sub-system data set was connected at all times from that point onwards.

There are two significant inefficiencies in this approach. The first inefficiency arises from the dilution of the statistical significance of the historical observations by only being able to use historical data that pertain to a particular sub-system. The historical observations of each sub-system can only be used by the sub-system which controlled the presentation in the particular interaction event. The confidences in the observations of the mean response rates and the confidences in the multivariate model coefficients (should there be any) are much lower than they would be if all the presentations had been controlled by one system.

From the description of the cost-gain approach to controlling campaign optimization in the present invention described above and in Appendix I, it can be seen that confidences in the estimates of the coefficients used to characterize the response behaviour play an important role in controlling the level of ongoing exploratory testing. Reducing the confidence of those estimates has the effect of increasing the exploratory behaviour of the system. If the splitting up of the data sets could be avoided then there would be significant gains in efficiency. Using the historical data from the Central Data Store, and applying the sub-system temporal depreciation schedule immediately before releasing the data to the Presentation Decision Manager offers a better solution. This permits the Presentation Decision Manager to use all historical records for the purposes of estimating coefficients which characterise the response behaviour such as those estimated by the cost-gain approach described in Appendix I (see FIG. 11).

The second inefficiency comes from the wasteful manual selection process used to test and select the best sub-system. Another way to think of the problem specified in FIG. 10, is as the process of selecting one proposition from three possible propositions in a way which maximizes an objective function (response performance, say). The problem is then described in precisely the same framework as the basic campaign configuration optimization problem solved using the cost-gain approach. As discussed previously the optimization of this problem involves an optimal balance between exploration and exploitation such that the overall system response rate is maximized.

Figure 11:
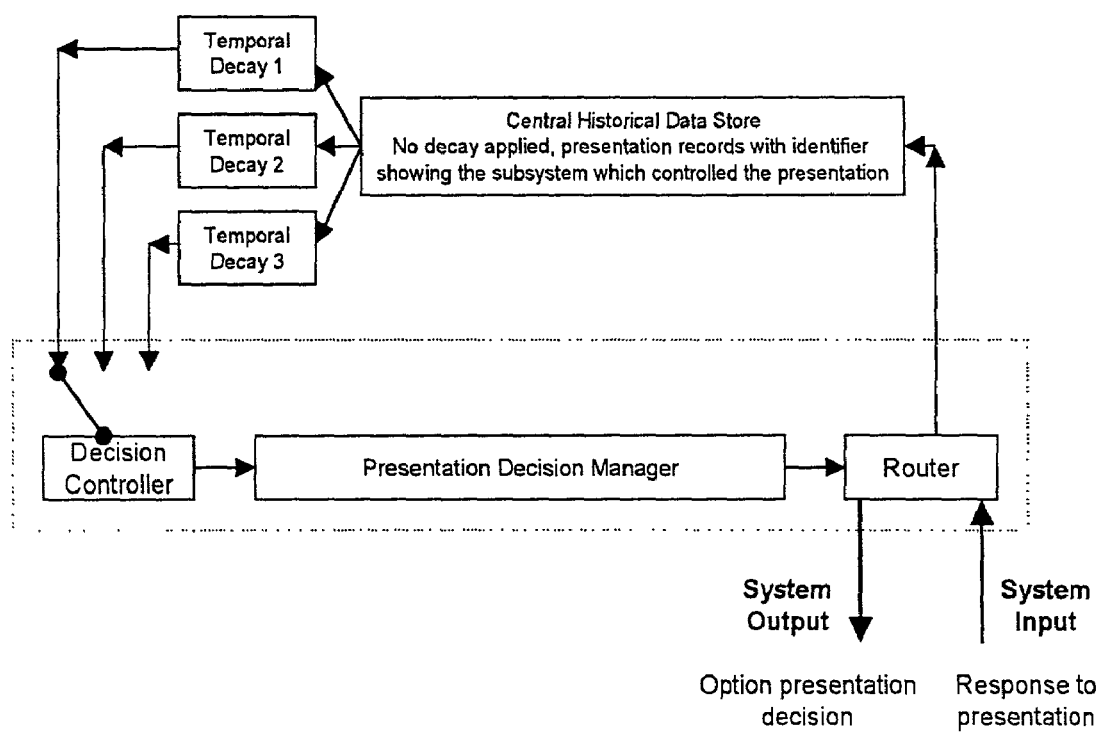
FIG. 11 illustrates a higher ranking level controller of the present invention managing the selection of sub-systems.

FIG. 11 shows the same problem placed within the framework of three simple propositions which need to be tested and selected in an ongoing way such that the overall system response is maximized. The Switch is replaced by a high level Decision Controller which is governed by the same cost-gain optimization presented in Appendix I for the basic campaign configuration.

The Decision Controller makes the selection of temporal depreciation sub-system by balancing exploration and exploitation activities in such a way as to maximize the objective function required by the system. Over time the high level Decision Controller learns which sub-system appears to be performing best and begins to preferentially select it as the favoured sub-system. In this way the system's performance tends towards that of the best performing sub-system over time.

By these means a system is able to adapt to an optimal temporal depreciation schedule by learning which schedule, from a portfolio of schedule propositions, offers the best return with respect to the desired objective function, the losses associated with the learning and selection of the favoured temporal depreciation schedule being minimized during the adaptation process. It should be noted that by applying a temporal depreciation to the historical records used as inputs to the high level Decision Controller, then the system will have an ability to continuously adapt and regulate the selection of low-level temporal depreciation. Evidently any temporal depreciation schedule used by the high level Decision Controller should apply a decay rate slower than that of the sub-system with the slowest depreciation schedule. If not, then the high level controller would not be measuring the real performance of that sub-system.

Figure 12:
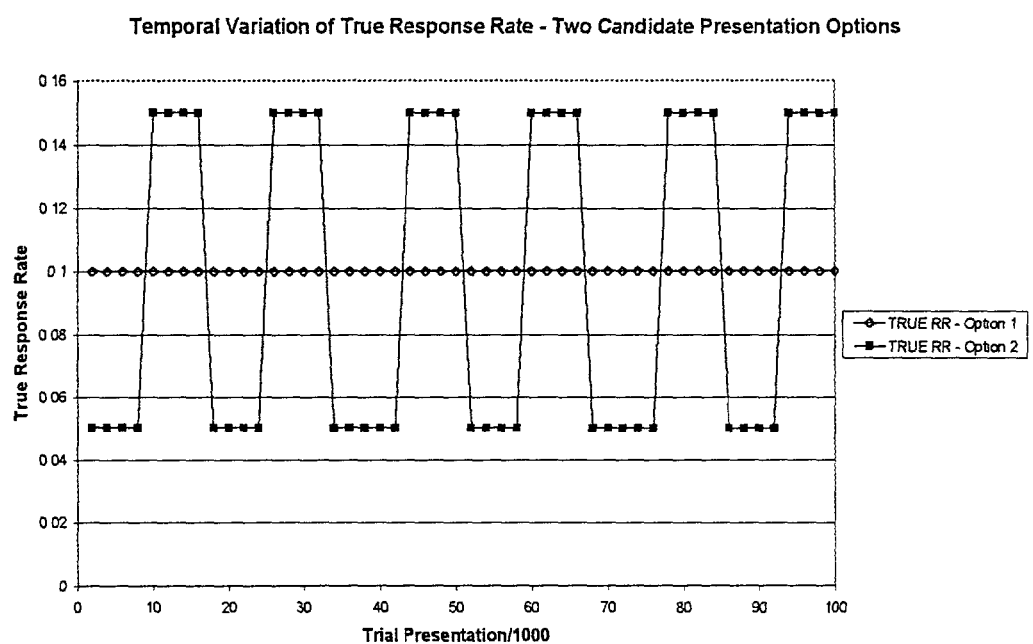
FIG. 12 illustrates an example of two options which exhibit temporal variations in true response rates.

To illustrate such a controller, consider the two options which exhibit the temporal variation in true response rate shown in FIG. 12.

Option 1 has a constant true response rate of 0.1 and Option 2 has a true response rate of either 0.05 or 0.15 with a cycle period of 17,000 presentations. The cumulative average true response rate of both propositions is 0.1 over a long period of time. Whilst there is a variation in the cumulative response rate of Option 2 over a short period of time, over a long time the cumulative true response rate of Options 2 and 1 will appear to be the same.

Assuming that the objective function is to maximize the response rate over a large number of trials, then a system which does not depreciate the weight of historical observations cannot exploit the periodic positive difference between the true response rates of Option 1 and Option 2. A system with three candidate temporal depreciation schedules was established and configured as described in FIG. 11.

Figure 13:
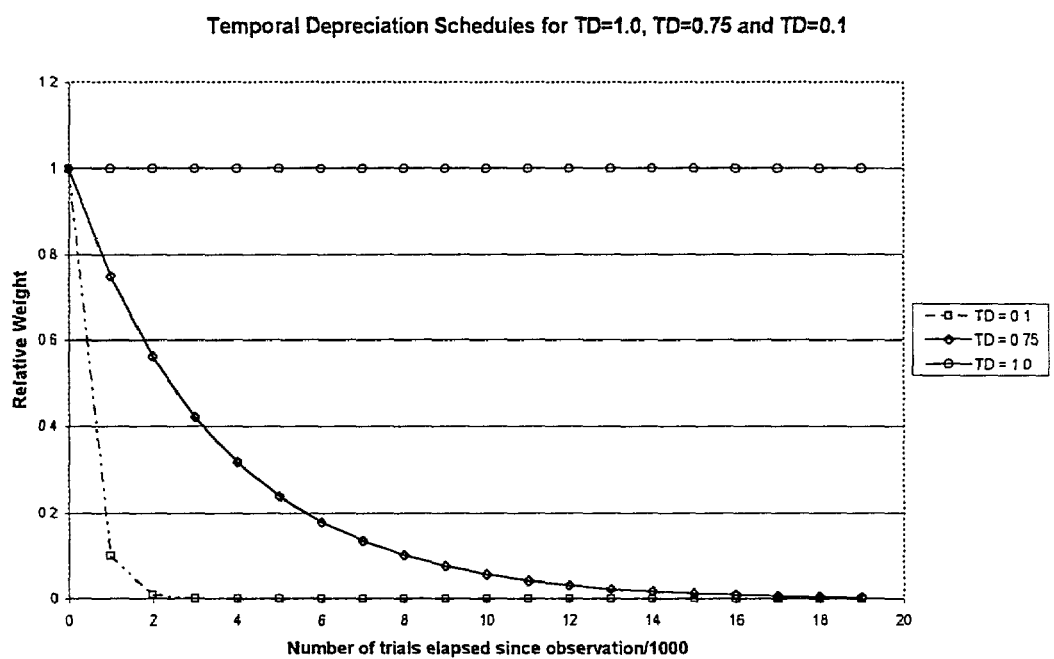
FIG. 13 shows a graph illustrating three different temporal depreciation factors.

The three temporal depreciation schedules each used a constant depreciation factor TD which was applied to the historical records after each 1000 system presentations. The temporal depreciation schedules applied to each of the three respective sub-systems are shown in FIG. 13 and comprise TD=1.0, TD=0.75 and TD=0.1

Figure 14:
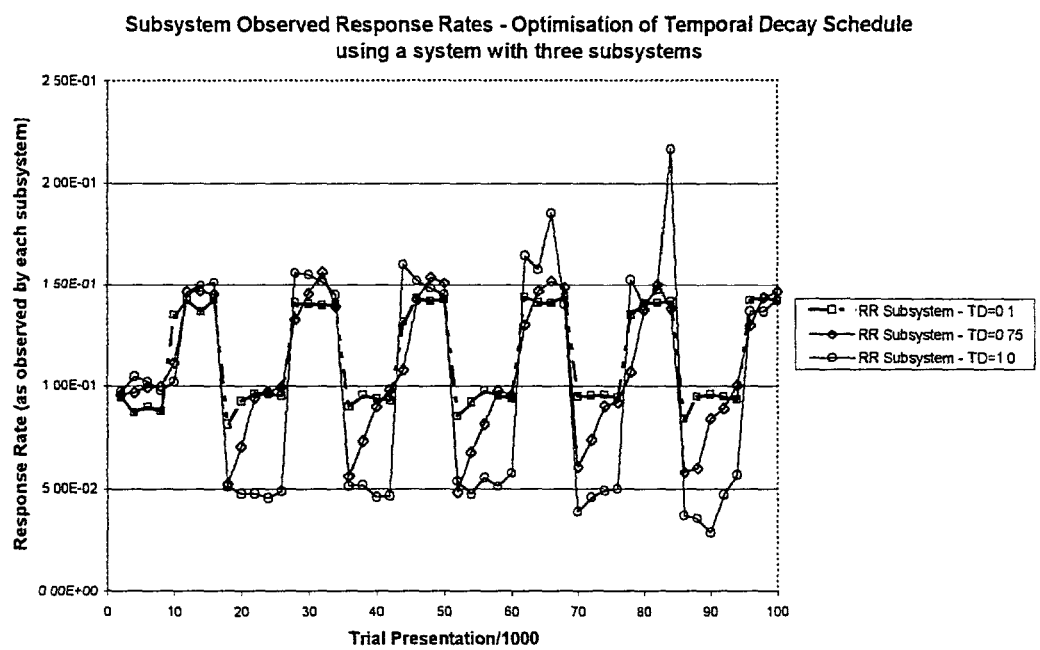
FIG. 14 illustrates the variation in observed response rate over the temporally depreciated records of each sub-system for the controller of FIG. 11.

The system was then tested over 250,000 trials, and the performance measured to observe the nature of the optimal convergence. The variation in observed response rate over the temporally depreciated records of each sub-system are shown in FIG. 14. FIG. 14 shows the first 100,000 trials only for clarity.

From FIG. 14 it can be seen that the sub-system with the highest temporal depreciation (TD=0.1) quickly observes and exploits the change in response rate between Option 1 and Option 2 as shown in FIG. 12. The sub-system with the lowest temporal depreciation (TD=1.0, which corresponds to no depreciation in the weight of historical observations) is unable to easily discriminate the response behaviours of Option 1 and Option 2. This is because Options 1 and 2 have the same average response rate when observed over a long period of time. The functioning of a sub-system operating with a specific depreciation schedule is complex. The sub-system's overall performance comes about as a function of the window of observation (depreciation schedule), and the relative observed performances of Options 1 and 2 by that sub-system within that window. It is made more complex by the fact that all information relating to historical presentations of Options 1 and 2 by any of the sub-systems is shared (though a sub-system can only view the historical data through its own temporal depreciation view.) The most important conclusion to be drawn from FIG. 14 is that the high temporal depreciation rate of sub-system TD=0.1 has allowed it to favourably track the proposition which offers the highest true response rate at all times.

Figure 15:
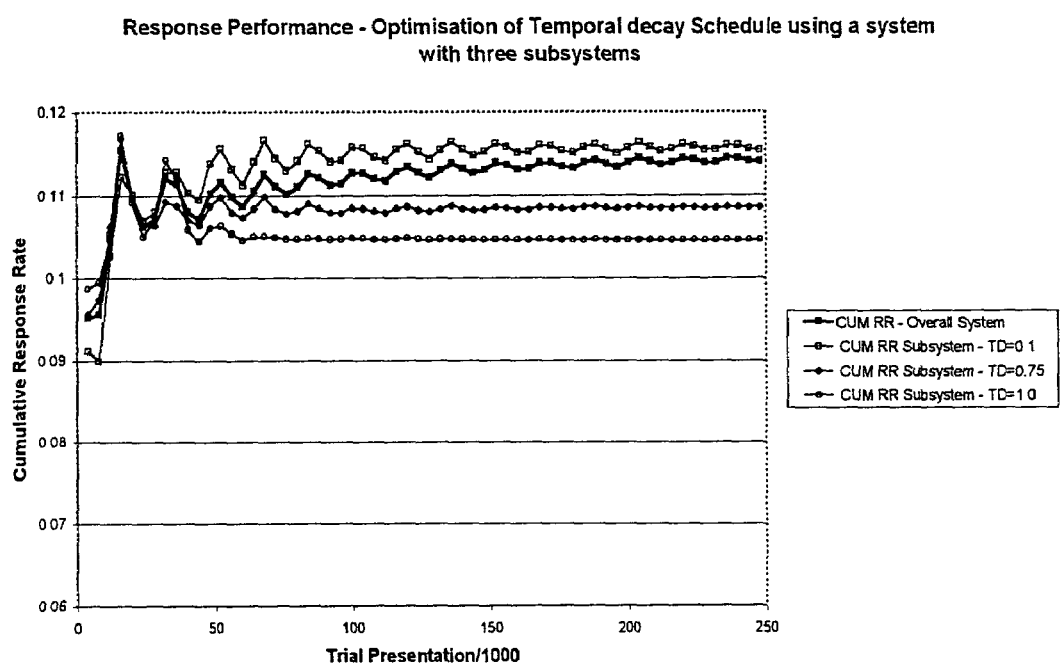
FIG. 15 shows a graph illustrating the cumulative response performance of each sub-system of the controller of FIG. 11, together with the overall system cumulative response performance.

FIG. 15 shows the cumulative response rates for the three component sub-systems with their respective temporal decay factors, together with the overall system cumulative response rate. It can be seen that the overall system cumulative response rate asymptotically approaches the performance of the best sub-system. How the system achieves this convergence can be understood from FIG. 16 which shows the number of times in each thousand trials that each sub-system is selected by the high level Decision Controller. Initially each sub-system is selected in equal proportion, until as one sub-system starts to outperform the others, this sub-system becomes favoured by the high level Decision Controller. From FIG. 16 it is noted that once the inferior performance of sub-system TD=1.0 had become evident then it was awarded less and less control of the presentations as the trials proceeded. Initially all sub-systems were being awarded one third of the presentations each. The system maintained an unbiased selection of the sub-systems for a fixed period until there were sufficient observations to span the temporal depreciation schedules being compared (in this case about 18,000 trials). After 100,000 trials sub-system TD=1.0 was being awarded control of only 10 presentations in every 1000 (i.e. 1% of the total) and TD=0.75 was being awarded 77 presentations per thousand (~8% of the presentations) The remaining 91% of the trials were being awarded to sub-system TD=0.1 which was the best performing sub-system up to that time. By the end of the 250,000 trials sub-system TD=0.1 was the clear favourite and was being awarded control of approximately 98% of all presentations.

Figure 16:
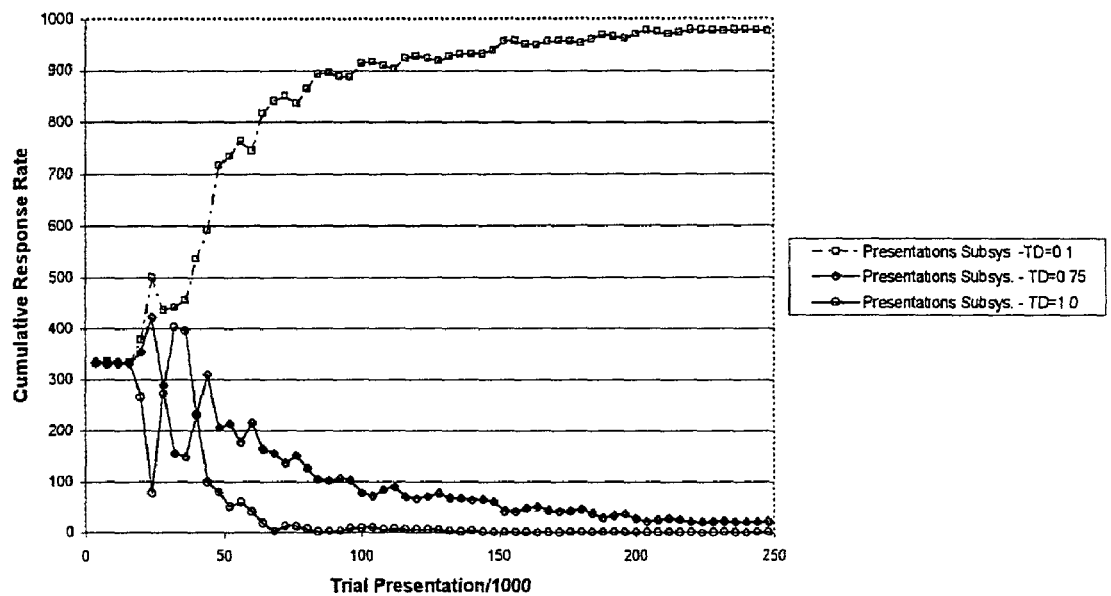
FIG. 16 shows a graph illustrating the number of presentations assigned to each sub-system by the controller of FIG. 11.

FIGS. 15 and 16 show optimised system response behaviour and presentation behaviours based on a test repeated 100 times with the results averaged (because of the stochastic nature of the response behaviour)

As a summary, the control of temporal depreciation schedule using a high level decision controller of the type described:

1. Does not interfere with the use of all historical observations for estimation of the coefficients that describe the response behaviour (including multivariate coefficients such as those defined in Appendix I).
2. Is a self-regulating system for controlling the choice of temporal depreciation schedule.
3. Balances exploitation and exploration during the process such that the overall objective function is satisfied very efficiently.
4. Does not negatively interact with the underlying process of selecting low level propositions (one of the two presentation propositions in the example above).

The Efficient Isolation, Measurement and Reporting of System Performance Using Specific Performance Metrics Quantitative methods have been applied for off-line marketing applications for more than twenty years (e.g. for targeted direct mail campaigns.)Quantitative methods have also been used online during the last five years or more (e.g. for controlling web-site content). The online variant of the technology is sometimes called "Personalization Technology". The mathematical processes being used to drive the decisions in online CRM applications are not yet well established, and the performance of the implementations is difficult to quantify.

The subject of this application is a system which uses recently developed and specialized quantitative methods which offer significant efficiency gains. These are defined as cost-gain approaches and are described in Appendix I.

This section defines controls dedicated to the task of quantifying the system performance and presenting the information in easily understood marketing terms. The present system can be described as self-auditing in that it measures its own performance directly. It does this by measuring the sales revenue and other metrics achieved by the system with respect to the performance of control groups. The measurement of performance against control groups is not itself new, but the way in which it is conducted by the system described is unique.

The measurement of Personalization system performance against a control group can be done by selecting a specific fraction of visitors and presenting them with random or controlled content. By comparing the performance of the group exposed to personalised content delivery against the control group, an estimate of the improvement resulting from personalization activities can be made. Unfortunately this type of measurement can be of limited use to marketers as they are not assisted in their understanding of what generated that improvement or how to generate additional gains. It is also expensive as a larger-than-necessary fraction of customers are compromised by offering them a lower level of service (those customers in the one or more un-Personalised control groups).

The present method involves measuring the "uplift" or efficiency gains from personalization activities in terms of two distinct components. Each of these components is then controlled separately. The first component of the gain relates to generalised efficiency improvements which arise from measuring, testing and controlling the content presented to customers in general, in such a way that the performance is maximized. This first component treats all visitors/customers as identical and seeks to continuously identify and present the content which, on average, delivers the most favourable response value. Most of this component gain arises from continuously testing and learning which are the products/services with the most favourable response values and making these products/services most accessible to visitors. The most common objective functions in marketing are the maximization of binary response rates or the maximization of response revenue or profit. There are others, but for clarity the example of maximizing a binary purchase response rate will be assumed in the following explanations. Generalised efficiency gains can be realized through the application of the cost-gain approach for the basic campaign configuration described previously.

The second component of the gain arises from the presenting of different content to each visitor based upon the particular activity profile of each individual. This is the gain attributable to targeting specific content to a specific customer under specific conditions (such that the expectation purchase response rate is maximized). For clarity of explanation the two components of the gains available from customization activities will be referred to as "generalised gain" and "targeting gain" respectively.

By measuring the separate components against each other and against a control group the marketer can understand what is driving the improvement, by how much, and what might be done to make further improvements. For example a simple campaign at a particular location on a web page may be controlling the presenting of ten possible propositions (see FIG. 8). By finding which proposition has the best true average response rate and preferentially presenting it to all visitors the system will perform much better than a system which presents one of those ten propositions at random to visitors. Using learned unbiased estimates of the average response rates as the basis for preferential presenting delivers the generalised component of the gain. There will be an additional gain if the system can learn which particular proposition is suited to which particular visitor type and match the best proposition to each different visitor (possibly also under particular conditions). This component of the gain would be the targeting gain.

A poorly configured campaign would have propositions that have similar appeal to all types of customer. If all of the propositions have similar appeal then the system will be unable to extract gains from targeting particular content propositions to particular individuals. This poor configuration is highlighted by the present system as the targeting gain would be low. In cases where the targeting gain is low this flags to the marketer that he/she may need to spend more effort in understanding the different customer segments and creating propositions which are likely to have different appeal to each segment (as this allows the system the greatest opportunity to exploit targeting gains). It may also be that the independent variables currently captured do not allow adequate discrimination of the different customer segments prior to the point of exposure of the content. In either case the marketer would know that there is little benefit being derived from targeting activities and that one or both of the indicated causes would be worth investigation.

In addition to exposing the different components of gain the present system minimizes the cost of the control groups. This is done with explicit management of the control group sizes such that a satisfactory statistical significance in the relative performance measurements of the respective groups is maintained.

In summary, the high level management of control samples in the present system offers three significant advantages simultaneously.
1. A mechanism for measuring and exposing the system performance
2. A mechanism for minimizing the cost of the control measurements whilst ensuring their statistical significance
3. A mechanism for marketers to understand what is driving improvements, quantifying the components and suggesting possible action.

To understand the gains from each component there follows an example which relates to the sale of Greetings Cards on the Internet.

Figure 17:
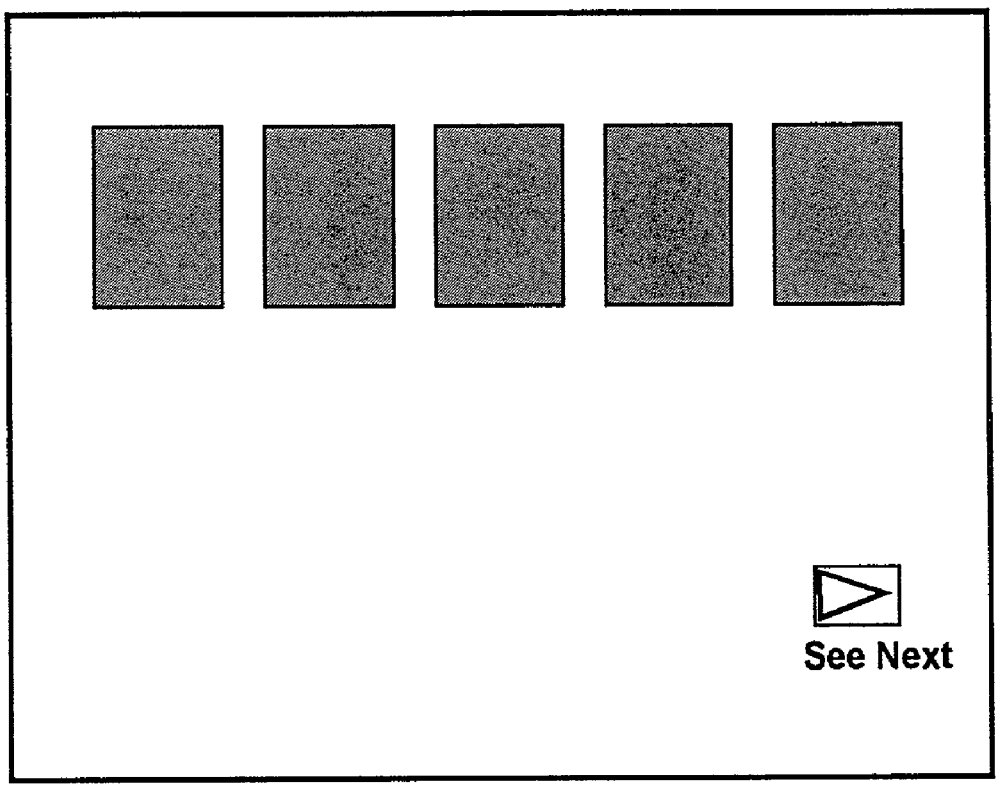
FIG. 17 illustrates an example of a web page selling greeting cards.

Assume that there exists a web site which sells greetings cards from a web site. This is the principal activity of the site. It can take considerable time to present a greetings card image over the Internet because of the image file size and the data transfer rates available through domestic Internet connections. Therefore, each page presents five small images of cards. If the visitor wants to see a card in more detail then the visitor can click on one of the small images and a "pop-up" box will present a larger image of the card (also slow to load and present—dependent upon the visitor's Internet connection). If the visitor wants to see more cards then they can click on a small arrow on the bottom of the page which then steps through to the next page with a new set of five cards. This is illustrated in FIG. 17.

The visitor may use this site to explore all the cards that may interest them and elect to make a purchase at any time by selecting a card and "adding to basket". Unfortunately there is much wasteful exploration in this process (sometimes called "friction" by marketers), as the visitor must step through the cards five at a time. This can be tedious for the customer.

The first step in minimizing the friction in this exchange is to identify all of the cards which the visitor is most likely to want to buy, and to order them in such a way that the visitor can access them in as few clicks as possible. A generalised gain can be realized by ranking all of the cards in order of their unbiased relative popularity, such that the cards in highest demand are always presented first. This is not straightforward since the card portfolio may change frequently and there may be very little data for the cards which have historically been presented towards the end of the queue.

This problem has been discussed and is efficiently solved using a controller based on the cost-gain type of solution described in Appendix I. In the solution an ongoing exploration/exploitation optimization takes place and generates an unbiased response rate ranking such that the overall campaign system response rate is maximized. In this respect, the ranking is irrespective of the interaction scenario occurring during the interaction event. This is indicated as the generalised gain.

The second step in minimizing the friction in the exchange is to use all information about a visitor's previous purchases to predict what particular cards might be of special interest to them. This information can be learned from the collective observations of a large number of visitors and specifically learning the relationships between the purchases of one card and another. It should be noted that these relationships between product offerings can be made using complex attribute systems which do not necessarily use the product ID as one of the independent variables.

It is not important to describe the precise workings of the predictive system for the purposes of describing the present device since this problem has been discussed and is efficiently solved using a controller based on the cost-gain type of solution described in Appendix I. In this way, the Personalization system can now rank all cards from the portfolio in order of the likelihood that any particular visitor may purchase those cards, based upon their observed preferences to-date. Thus, the presentation of a particular candidate proposition is according to the interaction scenario occurring during the response to the candidate proposition. This activity minimizes the navigational overhead (friction) of the exchange for each individual visitor and generates what is indicated as a targeting gain, over-and-above the generalised gain.

An appreciation of the metrics of the generalised gain and targeting gain can be obtained by studying the performance data in a special format shown in FIG. 18. Suppose that the site for the page shown in FIG. 17 is split up into sections and that under a particular section there are 21 different cards. Suppose also that it is desired to minimize the interaction friction by correctly predicting the next card that a visitor is most likely to purchase.

This can be conveniently done by reordering the presentation stream of cards in a way which reflects their expected relative interest levels for the customer. The Personalization Gains Chart shown in FIG. 18 is an example of a Gains Chart which shows the efficiency gains that may be derived from a controller which can correctly predict, select and present the most likely card of the next purchase. What the chart shows are the results of 1942 trials using a controller based on the cost-gain approach described in Appendix I. The controller was used to predict which card would be purchased next for a specific sequence of 1942 customers who were visiting the site.

However, the purpose of the chart is to show how successfully different types of approach or model are able to correctly predict the next purchase. Ideally a perfect model would be able to predict the next card purchase with 100% accuracy every time. In fact because of the stochastic nature of the purchase process a good model is unlikely to achieve such a level of success. Nevertheless, a good model should make significantly more correct predictions than random guesses. One of the purposes of the chart in FIG. 18 is to identify exactly how much more powerful a modelled prediction is than a random guess.

The top line of the chart shows the results of the first prediction. By selecting one of the 21 cards at random then on average it would be expected that the next purchase would be correctly predicted approximately 92 times out of the 1942 trials. This column has been completed based upon an estimate rather than actually performing the trials or presentations as the expected probability of success is known to be precisely 1/21 over a large number of observations. By using the card with the highest overall purchase rate from the Generalised Optimisation system (described in Appendix I as a binary response basic campaign configuration) as the first prediction then this was found to be correct 669 times.

This is a very large improvement over a random guess and represents a generalised gain of 669/92 (=7.27 times). By looking at the cards that the visitor has seen previously and using the expected card that each individual visitor might be expected to buy from the Targeted Optimisation system using a multivariate optimization system, the results were better still. The multivariate system used was similar to that described in Appendix I as a binary response multivariate campaign configuration, where each card is treated as an individual proposition, but where the interaction scenario is also characterised by other variables. This system correctly predicted the next card purchase 986 times out of the 1942 trials. The improvement in predictive accuracy derived from selecting the right card for a particular customer is the targeted gain. In this case there was a targeted gain available over and above the generalised gain, which was achieved by matching the right card type to each individual of 1.47 times (=986/669).

In this example, the objective was to predict the next purchases of the visitor in as few guesses as possible. By ordering the cards that customers were shown in the best way, the CRM system was able to maximize the likelihood of a purchase within the fewest possible interaction steps for the visitor. The right hand three columns of the chart show the cumulative performance of the personalization activities. It can be seen that 5% of the next purchases are correctly predicted by one random guess (trial), 34% correctly by one generalised ranked prediction, and 51% correctly by using one a targeted prediction. The figures for correctly guessing the next card purchased within two predictions (trials) are 10%, 47% and 63% respectively.

It will be noted that for targeted optimization then 80% of the purchases were correctly identified within the first five cards presented. It can be seen that the values of the optimization systems is that they offer an opportunity to considerably reduce the friction in a purchasing exchange between a customer and a web site. In addition, it can be seen in this example that targeting optimization offered a considerable improvement over and above generalised optimization activities. Note that as expected, within the 21 possible guesses 100% of purchases are correctly predicted since there were only 21 cards in the example.

Performance Reports for Dynamically Optimised Campaigns

A portfolio of propositions managed as a set such as that depicted in FIG. 8 is sometimes known as a campaign. The campaign performance is presented conveniently as a campaign performance chart like FIG. 19.

FIG. 19 is an example of a campaign performance chart for a basic configuration where no independent variables were available to describe the response interaction scenario. This corresponds to the case where generalised gains may be made but there is no opportunity for targeting (i.e. no opportunity for preferentially selecting propositions on the basis of the prevailing conditions). For the purposes of the explanation, it is assumed that the campaign propositions are being managed by an automated system such as that previously described as a binary response basic campaign configuration.

The chart shows the performance of a binary response basic campaign configuration in which there are a set of eight propositions. The propositions are ranked in terms of their overall observed response rate ("Obs.RR"). Each proposition has a unique identifier ("C-Option ID") and has been ranked in descending order of the observed response rate ("Rank"). The ID number of the identifier has no relevance in the present situation. For each proposition the number of times that it was presented ("Present'ns") and received a positive response from the visitor following a presentation ("Resp's") are shown. The cumulative presentations ("Cum.Pres'ns") and cumulative responses ("Cum.Resp's") are also shown across all the propositions of the campaign so that the overall performance of the campaign system can be understood. The cumulative response rate across all the propositions is also shown ("Cum.RR").For example, the cumulative response rate of the first two propositions would be computed as the sum of the responses of the first two propositions divided by the sum of the presentations of the first two propositions.

The "Index" column shows the cumulative response rate as a percentage of the response rate achieved by a random control (explained later). In this example the response rate of the best performing proposition was 0.04586 and the overall campaign was achieving a cumulative response rate of 0.04477 across all propositions. It is clear from the Gains Chart that the management system controlling the campaign is preferentially presenting those propositions which exhibit the highest response rates. At the bottom of the Gains Chart is a section which shows the performance of the system with respect to a Random control sample. The random control size was fixed in this particular case to 1% (i.e. on average, one in one hundred presentations was a random control). The Index shows the relative performance of the system with respect to the Random control as being 222 this is evaluated as 100 times the overall campaign response rate divised by the Randdom control response rate (i.e. 100× 0.04477/0.0202). This represents a 122% improvement in response rate over Random selection of the proposition. The statistical significance of the observation is 0.000 which is highly significant.

FIG. 20 is a campaign performance chart for the more general case where there are independent variables available which characterize the interaction scenario of each event (e.g. a binary response multivariate campaign configuration.) In this case the independent variables offer an opportunity for targeting the proposition based upon the specific set of prevailing conditions. These conditions may include the profile of the current customer to whom the proposition is being presented. The format of the display is similar to that used for the simple optimization represented in FIG. 19, with the exception that there are now two separate control sets. The first control is a random sample as before. The second control is a generalised (optimal) control.

The management of each presentation in the generalised control has been performed without using any of the scenario descriptors which allow targeted optimization to take place. The system used to control the presentations within this generalised control might be a system similar to that described as a binary response basic campaign configuration. The purpose of this control is to isolate exactly what contribution to the overall gain was made through the generalised optimization process, and by doing this also expose what additional gain was made through targeting, over-and-above generalised gains.

The index of 163 indicates that the improvement in performance of the overall system against the generalised control was 1.63 times. This means that the benefit of targeting yielded a further gain of 1.63 times over-and-above that delivered through generalization optimization activities. The significance of 0.001 is based upon a statistical test that the observed mean response rates are truly different and would have been unlikely to occur by statistical chance. The significance of 0.001 means that based upon the assumptions of the test the observed difference in response rates between the overall system and the control sample would have had only a one in one thousand probability of being observed by chance, were the two response rates actually the same. The test used in this case was Student's t-test for unequal means, but another statistical test for characterizing the differences between means or distributions could have been used as a validation metric.

In the example of FIG. 20, the cumulative response rate across the whole campaign was 0.1123 (or 11.23%). Note that as the system is now also performing targeting, the selection of proposition for presentation is no longer driven by the proposition's overall average response rate, but also whether or not the proposition is predicted to give the highest response rate given the specific set of conditions prevalent at the time. The number of times that each proposition was selected during the campaign depended primarily upon the number of scenarios which occurred in which that proposition was predicted to exhibit the highest response rate.

The way in which the system gains are measured with respect to the control samples can be different from that used in the example. In the example, the overall system performance was used as the reference with respect to the response rates of the controls. Of the three available sub-systems in the example (Random presentation, generalised optimal, or targeted optimal) any one of them, or combination of them might also be used as the reference. However, the purpose of the measurement is to make statistically significant observations which allow the gain components arising from generalization optimization activities and targeted optimization activities to be separated.

This chart is a powerful summary of the system performance for any particular campaign. The use of the two component control samples is an important feature. The number of propositions in the completed chart will normally be the complete list of propositions being managed in the campaign, though for convenience the chart may be trimmed to display only the top 'N' performing propositions, the top 'N' propositions with the highest response volumes, or the top 'N' propositions with the highest presentation volumes, say. The remaining propositions might then be presented as a single aggregated proposition group called "Other". Thus, FIG. 21 is a compact form of FIG. 20 where only the top five propositions with the highest response rates are individually identified. The remaining propositions have been aggregated together.

Whist the charts in the examples are based upon a binary response/non-response measurement, they could equally well be based upon the monetary value of the responses, or any other ordinal measure. In the case of using monetary value of the response as the success metric then the charts would show the propositions ranked in order of their average monetary response value. The control samples would then measure the significance of the differences between the average monetary response values of each component sub-system.

The chart can also be used to display a temporally depreciated summary such that it represents the system performance over a specific time window, or with respect to a specific temporal depreciation schedule. In such a case the number of presentations, responses and cumulative indicators are all depreciated quantities (after applying the temporal depreciation weighting schedule). This can be useful where it is desired to observe changes in the system performance over different historic periods, or perhaps to view the performance using the temporally depreciated data view used by the optimization system itself (should the system be using a temporal depreciation schedule).

Automated Management of Control Sample Sizes

In the preceding description about using control samples, the sample sizes were fixed at 1%. A fixed control sample size is not a good way to ensure that the observed performance is statistically significant. It is also not a good way to ensure that the system performance is compromised as little as possible by the control sampling activities. The purpose of the controls is to measure a statistically significant gain. As such, once the significance of the performance measurement has reached the desired threshold then it is only required to perform additional testing to maintain that significance. Evidently there is a cost associated with using control samples as a certain number of customers must be presented sub-optimal propositions. Presenting sub-optimal propositions results in a lower response rate within the control sample, and less-happy customers. Therefore it is highly desirable to minimize the size of the control samples.

Figure 22:
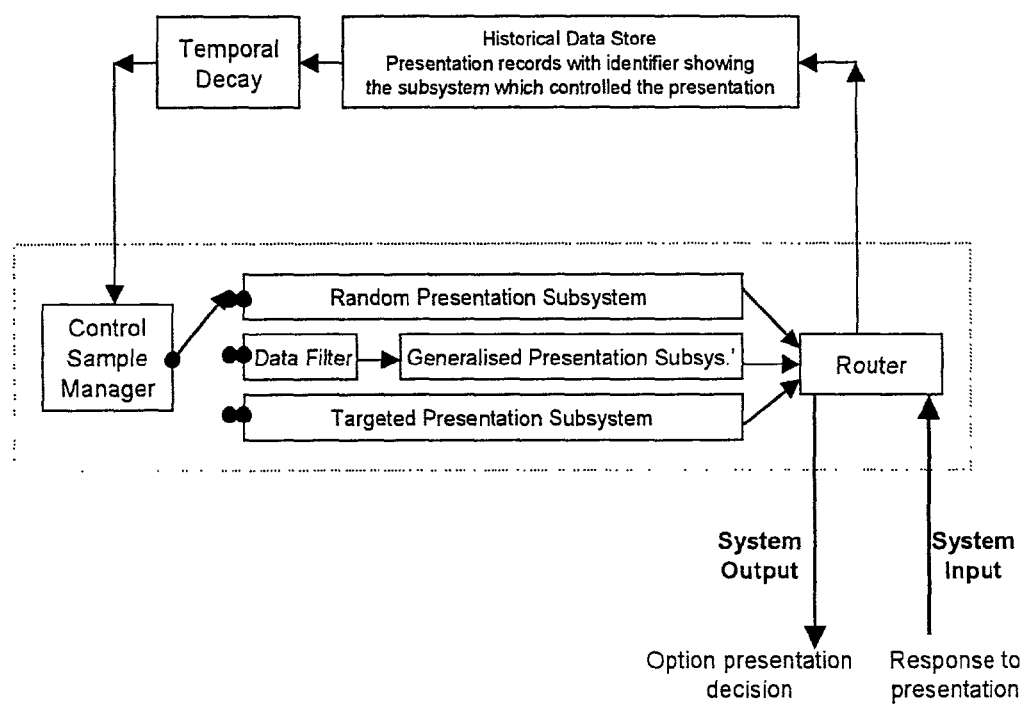
FIG. 22 illustrates a system controller of one embodiment of the present invention using a Random, Generalised and Target Presentation sub-system.

FIG. 22 describes a process by which the control sample sizes can be automatically managed such that the desired significance of the measurement is obtained (where possible) whilst minimizing the number of customers exposed to sub-optimal control content.

FIG. 22 assumes the case where there are independent variable descriptors available which characterise the interaction scenario, and which permit the use of targeted optimization. From the figure there are three sub-systems which are able to control the decision about which proposition should be presented. These sub-systems are the Random Presentation Sub-system, the Generalised Presentation Sub-system and the Targeted Presentation Sub-system. The selection of which sub-system is actually allocated the responsibility for a particular presentation decision is decided by a higher ranking level controller identified as the Control Sample Manager. The function of the Control Sample Manager is to allocate responsibility for presentations in a way which simultaneously satisfies the control significance criteria set by the user and minimizes the size of the control samples. The Router takes the presentation decision and routes it to the display sub-system which manages the actual display of the proposition. The Router collects the response data resulting from the presentation and sends this information back to the Historical Data Store (HD Store), flagged with an identifier which shows the sub-system which made the presentation decision.

To make a new presentation decision the data in the HD Store is temporally depreciated (if a temporal depreciation schedule is being used) and made available to the Control Sample Manager. The Control Sample Manager makes its decision about which sub-system should take responsibility for the next presentation and connects the selected sub-system to the HD Store.

Efficient Use of Historical Observations

It should be noted that there is a data filter in front of the Generalised Presentation Sub-system to limit the set of data which is visible to it. In order to maximize the efficiency with which decisions can be made, then wherever possible historical presentation information is shared between the sub-systems (by basing decisions on more observations, then the confidences in those decisions will be higher) .However, only certain subsets of the data may be used by the Generalised Presentation Sub-system for driving decisions. The Random Presentation sub-system selects one of the propositions from the portfolio at random and therefore does not use historical observations at all in the decision process. The Generalised Presentation Sub-system can make use of observations resulting from both the Random Presentation Sub-system and previous presentations generated by itself. It cannot make use of previous presentations which were controlled by the Targeted Presentation Sub-system as these are not independent of the interaction scenario conditions (and therefore cannot serve as the basis for assessing the unbiased generalised response performance of the campaign propositions). The data filter in front of the Generalised Presentation Sub-system performs this function, removing observations which relate to targeted presentations from the historical data before passing it on. The Targeted Presentation Sub-system can make use of all previous observations.

In situations where Targeting is being used, it should generally perform significantly better than either Random or Generalised. Therefore in practice the Targeted Presentation Sub-system tends to be preferentially selected by the Control Sample Manager to make the presentation decisions. This means that a large fraction of presentation decisions are typically based upon the full set of historical observations to-date, making efficient use of the data.

Figure 23:
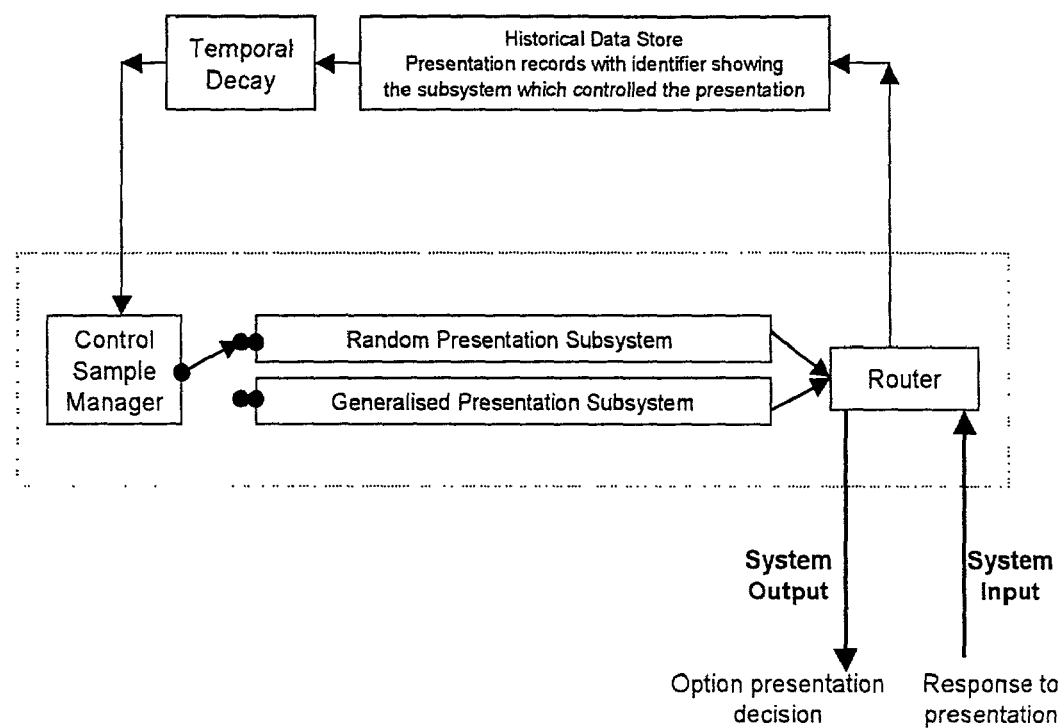
FIG. 23 illustrates a system controller of another embodiment of the present invention using a Random and Generalised Presentation sub-system.

Note that FIG. 22 reduces to FIG. 23 in the case where no Targeted Optimisation is taking place. The system operates in a similar way, but the operation of the Control Sample Manager becomes simplified as there are now only two possible choices of sub-system. Note also that there is no longer a need for the data filter in front of the Generalised Presentation Manager (as there is no data from Targeted activities in the HD store).

Figure 24:
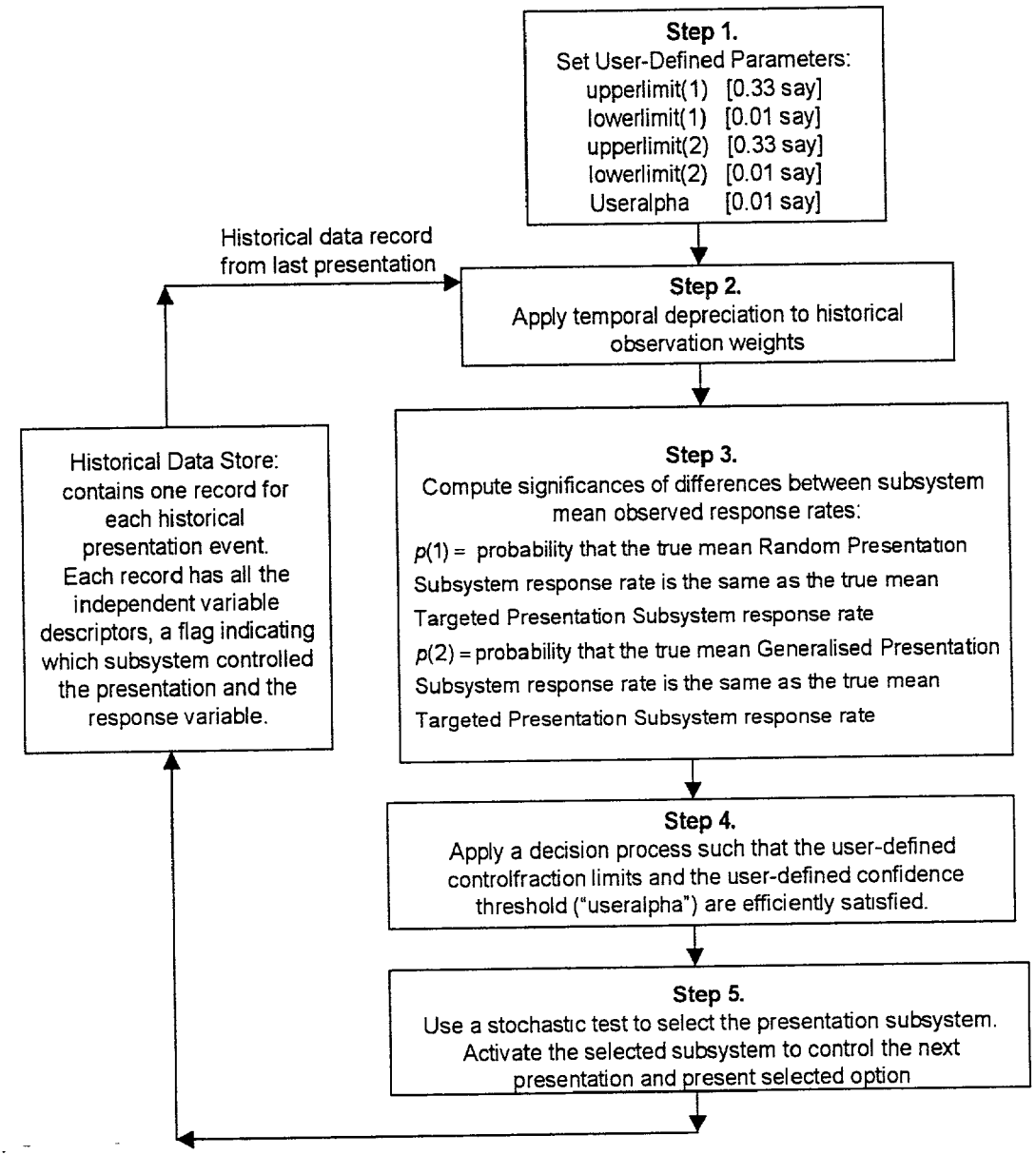
FIG. 24 is a flowchart describing the decision steps used by the system controller of FIG. 23.

FIG. 24 is a flowchart describing the decision steps used by the Control Sample Manager whilst the actual decision process itself is described by the pseudo-code in FIG. 25.

From FIG. 24 it is seen that in Step 1 several user-defined parameters must be set. These parameters define the upper and lower limits for the fractions of total presentations that may be dedicated for specific controls. Upperlimit(1) is the upper limit for the fraction of presentations that can be used for the Random Control. Lowerlimit(1) is the corresponding lower limit for the fraction of presentations that can be used for Random Control. Upperlimit(2) and Lowerlimit(2) are the upper and lower limits respectively for the fraction of presentations that can be dedicated to the Generalised Control. The desired confidence threshold which is acceptable to the user is stored by the parameter Useralpha (two commonly used values of Useralpha are 0.05 or 0.01). Example values for the user-defined parameters are shown inside square brackets.

The Historical Data Store contains one record for each historical presentation event. Each record has a set of independent variable descriptors of the interaction scenario, plus the response value which was stimulated by the proposition presentation. Before being used by the sub-systems for decision making the weights of these records may be depreciated according to a specific temporal depreciation if desired. The purpose of the temporal depreciation is to reduce the weight of older observations such that they carry less influence in the decision-making process. Step 2 of FIG. 24 applies a temporal depreciation if one is being used.

Step 3 is the computation of the significance of the differences in the mean response rates observed for each of the controls versus the reference data set. The reference data set in this case is the set of observation records which were managed by the Targeted Optimisation sub-system. A Student's t-test for unequal means is a convenient test to apply as it is able to accommodate mean response rates based upon binary responses or ordinal responses. The actual statistical test used is not important provided that it is able to generate a confidence that the true means of the two sets being compared are unequal (or equal).

From FIG. 25 a desired controlfraction is computed for each of the control groups from Equations 1 & 2 respectively. The function described by Equations 1 & 2 has useful characteristics, and is used by way of example. The desired characteristics of the system are:

1. The controlfraction defined tends to zero as the probability that the mean response rates of the two data sets being compared are the same tends to zero.
2. The controlfraction defined is positively correlated with the probability that the mean response rates of the two data sets being compared are the same (i.e. if the probability is higher then the defined controlfraction is higher, and vice-versa).
3. The range of controlfractions defined by the function are between unity and zero (in this particular case between 0.5 and zero).

The function then has the effect that the control sample which is observed to be least significantly different from the reference group is assigned a higher controlfraction, and therefore tends to be preferentially selected for presentation. This tends to ensure that both control groups are maintained equally significantly different from the mean response rate of the reference group.

Any system which ensures that the control group whose mean response rate is least significantly different from the reference mean response rate is preferentially selected for presentation could replace the example system (though the one described is particularly efficient). The purpose is to maintain the significance of the control groups at a similar level of confidence with respect to the reference group.

Having determined the relative sizes of each control group's controlfraction, a stochastic test is performed to determine which sub-system will control the next presentation. In FIG. 25 "sub-system 1" refers to the Random Presentation Sub-system, "sub-system 2" refers to the Generalised Presentation Sub-system, and "sub-system 3" refers to the Targeted Presentation Sub-system.

In summary, the Control Sample Manager smoothly controls the fraction of presentations being managed by the Random and Generalised Presentation Sub-systems whilst maintaining the significance of the control group performance measurements within the desired useralpha. The control group sizes can also be constrained within specific upper and lower size bounds if required. A special function is used which results in the Control Sample Manager maintaining an equilibrium between the significance of the two control group performance metrics.

Steps 2 to 5 of FIG. 24 are repeated as the system performs the routine of managing the control group sample sizes.

Using High Level Control Sample Management as a Mechanism for Controlling Temporal Stability The problem of temporal stability for regression based on-line systems has been discussed previously. The problem arises for situations in which the true response behaviour changes over time. This is because without ongoing exploration the system is unable to maintain confidence that the modelled response behaviour adequately represents the true behaviour. It was also suggested that this might be overcome were there a method which was able to control the level of exploration activity such that confidence could be maintained. In fact the automated management of control sample sizes using the method described in the preceding section (and by FIGS. 22 to 25) can also be used to fulfil exactly this function. Given upperlimits( ) for the controlfractions which are sufficiently large (say up to 33%) then the system is able to manage and regulate the level of exploratory activity in a such a way that regression-based presentation sub-systems can operate in a sustainably optimal way.

The way in which the high level sample control manager enables this can be explained as follows:

1. Supposing that a new system such as that depicted in FIG. 22, commences operation with no historical records. Suppose also that the Targeted Presentation Sub-system is based upon a regression method.
2. A regression model might then be programmed to rebuild periodically after a fixed number of observations have been made, or after a fixed period of elapsed time. After the system had collected a certain number of observations (or after a certain period of time) the regression model could be built on that data, and used as the heart of the decision-making of the Targeted Presentation Sub-system, until such time as the model needs to be rebuilt. Note that the model might instead be updated incrementally after each individual observation.
3. Assuming that there is predictive power available from the independent variable descriptors stored in the Historical Data Store then the Control Sample Manager will begin to see a significant difference between the response rates being stimulated by the Targeted Presentation Sub-system compared to those being stimulated by the Generalised Presentation Sub-system. This means that the probability of equal means "p(2)" from Step 3 of FIG. 24 will become much less than unity. As "p(2)" falls then control fraction (2) from Equation 2. of FIG. 25 also falls. There will also begin to be a significant difference between the response rate performance of the Targeted Presentation Sub-system and the Random Presentation Sub-system causing a corresponding fall in p(1) from Step 3 of FIG. 24. This directly controls the level of exploratory testing (in this case the fraction of presentations being assigned to the Generalised Presentation Sub-system and the fraction of presentations which are assigned to the Random Presentation Sub-system, both of which are "exploratory" from the viewpoint of the Targeted Presentation Sub-system).
4. After a longer period of time the low level of exploratory activity will compromise the ability of the regression model of the Targeted Presentation Sub-system to maintain accuracy (assuming that there are changes in the true response behaviour of visitors over time).
5. There will come a time when the significance of the differences between the observed mean response rates of the Targeted Presentation Sub-system and the Generalised Presentation Sub-system, and the Targeted Presentation Sub-system and the Random Presentation Sub-system are in equilibrium with the level of exploratory testing. i.e. a point is reached where stable minimum values p(2) and p(1) are reached, and where the controlfraction(2) and controfraction (1) are the at a minimum level required to sustain the accuracy of the regression model. At this time the system reaches self-regulation.

Distributed Agents

Distributed agents are becoming increasingly used as time saving devices in networked environments, where there is distributed computational power which can be harnessed. For example agents can be used to monitor and find the cheapest price for a particular product using the Internet as the networked medium. In such a case the agents can be used to search and locate vendors or suppliers of the requested services (or the other way around, locating prospective purchasers for specific products or services.) The power of distributed agents comes from the fact that large numbers of agents are able to search in parallel, making good use of under-utilized distributed computing power. Agents need to have a mechanism for sharing information in a standard format, and individually depend upon an efficient search strategy. Wherever an objective can be defined, and where the interaction environment can be defined in terms of a set of variable descriptors, then the present device represents a formal method for maximizing the efficiency of the individual agents and providing a multivariate framework within which the learned information can be shared. The learned information is represented by the coefficients in the multivariate mathematical representation of the response behaviour observed by the agent (such as those defined by the weight vector "w" in Equations 13 to 26 in Appendix I).

Consider the case where an agent is required to find the best price for a particular product. Previously other agents may have been requested to perform the same task. By sharing all of the previous observations made collectively (information about the product being studied and which suppliers gave which particular responses) the agents will be able to most efficiently obtain the best quotation within the fewest possible trials. This is done by ensuring that at all times the agents use an optimal exploration/exploitation strategy such that on average they are able to consistently find the best quotation after polling a finite number of potential suppliers. By using the present device they will also be able to accommodate temporal changes in the market by using an optimal temporal depreciation of historical observations.

Robotics

Robots which are required to operate in unstructured environments cannot easily be programmed to do so by using rule-based logic. For example, a robot vacuum cleaner may accidentally vacuum laundry and clothing from the floor because of its inability to easily recognize and discriminate such articles. It is a difficult task to define articles of clothing (say) in a structured language sufficiently well for a robot to be able to discriminate them with confidence from other articles. In the real world there are a very large number of such unstructured problems which a flexible robot device would be required to learn if it were to be safe and efficient.

One way for robots to learn to manage such problems is to allow them to learn collectively within a standard information framework, and then to provide a mechanism for sharing that learned information. In the case where a robot has one or more sensors from which data which characterizes its own state and the state of its interaction environment are measured, then the problem can be expressed within the multivariate framework of Equations 13 to 28 of Appendix I. Given an objective function the robot would be able to decide which of a series of candidate actions should be taken such that the objective function is sustainably optimized. The robot's actions would follow a sequence which fulfils the need for ongoing exploration (which improves its confidence about the outcomes associated with particular actions under specific conditions) whilst efficiently exploiting previously learned activities. The multivariate framework also allows the exchange of coefficients within a formal framework such that a previously untrained robot could be given the knowledge of another. Note that as mentioned in Appendix I the method is readily extended to a kernel defined feature space such that complex non-linear relationships and interactions can be modelled. Note also that one of the main features of the control device in a robot controlling application is that the robot will be stimulated to explore its operating envelope in a way which balances self-training and the maximization of the objective function (given the set of sensors and multivariate descriptors available.)

It will be appreciated that the present invention is capable of application to a wide variety of technologies with modifications as appropriate, the detail of which will be readily apparent to those skilled in the art.

It will be appreciated that whilst the term candidate proposition and presentation thereof has been used in the context of the example of marketing on the Internet, the term encompasses a candidate action option and the section thereof. Thus, the proposition can encompass the selection of an action, for example only, this is particularly appropriate to the application of the present invention in the technical field of robotics.

The following appendix forms part of the disclosure of this application.

APPENDIX I

Formal Expression of the Optimisation

Binary Response Basic Campaign Configuration

Assume that at each stage based upon the previous experiences with option i there is a posterior distribution of probability that the option has success probability p. In a classic Bayesian framework with a uniform prior this probability is given by $$\frac{1}{B(l_i+1, n_i-l_i+1)} p^{l_i}(1-p)^{n_i-l_i} \tag{1}$$

where there have been $n_i$ displays of option i with $l_i$ successes, and $$B(s,t) = \int_0^1 x^{s-1}(1-x)^{t-1} dx \tag{2}$$

is the Beta function. We denote this probability density at step t by $$f_i^t(p)dp = d\mu_i^t(p) \tag{3}$$

but will usually suppress the superscript t when this is clear from the context. Given that we know the probabilities of the different response probabilities we can write down the expected regret* at stage t as $$R_t = \int_{0^k}^{1^k} \left[ \max_i \{p_i\} - \sum_{j=1}^k n_j p_j \right] \prod_{i=1}^k f_i(p_i) dp_1 \ldots dp_k \tag{4}$$

*regret is a term used for the shortfall in performance between always presenting the true best option and using the options actually presented. The expected regret is the expectation of the regrt based on our estimates of the likelihood of the different possible values for the option response rates.

where there are k options. We can decompose the integral for $R_t$ into subintegrals covering the sets of ρ's for which i is the best response. If we denote these quantities by $R_{t,i}$ then $$R_t = \sum_{i=1}^{k} R_{t,i} \quad (5)$$

where $$R_{t,i} = \int_0^1 f_i(p_i)\,dp_i \int_{0^{k-1}}^{p_i^{k-1}} \left[ tp_i - \sum_{j=1}^{k} n_j p_j \right] \prod_{j \neq i} f_j(p_j)\,dp_j \quad (6)$$

$$= \int_0^1 d\mu_i(p_i) \int_{0^{k-1}}^{p_i^{k-1}} \left[ tp_i - \sum_{j=1}^{k} n_j p_j \right] \prod_{j \neq i} d\mu_j(p_j) \quad (7)$$

$$= \int_0^1 d\mu_i(p_i) \left[ tp_i \int_{0^{k-1}}^{p_i^{k-1}} \prod_{j \neq i} d\mu_j(p_j) - \sum_{j=1}^{k} n_j \int_{0^{k-1}}^{p_i^{k-1}} p_j \prod_{j \neq i} d\mu_j(p_j) \right]$$

$$= \int_0^1 d\mu_i(p_i)$$
$$\left[ (t - n_i) p_i \prod_{j \neq i} \mu_j[0, p_i] - \sum_{j \neq i} n_j \prod_{j' \neq i, j} \mu_{j'}[0, p_i] \int_0^{p_i} p_j\, d\mu_j(p_j) \right]$$

$$= \int_0^1 d\mu_i(p_i) \prod_{j \neq i} \mu_j[0, p_i]$$
$$\left[ (t - n_i) p_i - \sum_{j \neq i} n_j \int_0^{p_i} p_j\, d\mu_j(p_j) / \mu_j[0, p_i] \right]$$

$$= \int_0^1 d\mu_i(p_i) \prod_{j \neq i} \mu_j[0, p_i] \left[ (t - n_i) p_i - \sum_{j \neq i} n_j E_{\mu_j[0, p_i]}(p_j) \right]$$

where we denote by $\mu[0,\rho]$ the integral $$\mu[0, p] = \int_0^p d\mu(x) \quad (8)$$

and by $E_{\mu_j[0,\rho_j]}(\rho_j)$ the expectation $$E_{\mu_j[0,p_i]}(p_j) = \frac{\int_0^{p_i} p_j\, d\mu_j(p_j)}{\mu_j[0, p_i]} \quad (9)$$

To avoid the evaluation of the full integral the following approximation can be made. Fix the most probable value for $\rho_l$ and assume that all of the distribution of $\mu_1$ is concentrated on that value which we will call $\rho_l^*$. The integral then simplifies to $$R_{t,i} = \prod_{j \neq i} \mu_j[0, p_i^*] \left[ (t - n_i) p_i^* - \sum_{j \neq i} n_j E_{\mu_j[0, p_i^*]}(p_j) \right] \quad (10)$$

The goal is to choose the option that controls the growth of R most effectively. One effective and stable strategy for managing the growth of R is to choose the option l for display for which $R_{t,l}$ is maximal. This ensures that this component will not increase in the next step (ignoring small changes in the posterior distributions). The other options will potentially grow but if they increase too much they will overtake $R_{t,l}$ and hence become chosen as the option for display at a later stage.

Recap of the Presented Bayesian Approach

Before elaborating on the derivations so far it is useful to recapitulate the method as it stands. The Bayesian approach starts from the estimate of the expected regret. The expression simply averages the regrets for different sets of probabilities for the options each weighted by its likelihood. As each trial or presentation is performed this estimate becomes more and more accurate based on the experiences observed as different options are tried. The aim is to choose the option that will best control the growth of this estimate. The expression is increased if we use options that we are sure are worse, and hence the obvious way to control the growth is to choose the option with the highest expected return. However, options with lower expected return but with high uncertainty also contribute to the expression, as there is considerable likelihood that their true return is actually the largest. The Bayesian approach balances these two conflicting ways of reducing the expected regret, by choosing the option that currently contributes most to the overall expected regret. If this is because it is the best option then this corresponds to exploitation, while if it is actually as a result of uncertainty in our estimation of its true probability, then it corresponds to exploration. In both cases the growth in the expression will be controlled, either by picking the best option or by increasing the accuracy of the estimate of a non-optimal option.

Ordinal Response Basic Campaign Configuration

Now consider the case where the response is a number in the interval [0,1]. Assume that for each option i the response is generated by an unknown but fixed distribution.

In order to apply a full Bayesian analysis, a prior distribution and parameterized family of distributions would be required, which could be updated to accommodate the newly observed responses. Two simple solutions are constructed. One solution underestimates the variance and the other overestimates it. Since in the application most of the variance typically arises from the existence or otherwise of a response, then the two strategies sandwich the true response variance very tightly.

Under-estimating the Variance

Decomposing the response expectation into the probability of eliciting a non-zero response multiplied by the expected response value given a response, yields the same update rule for the posterior distribution for the probability of a response:

$$\frac{1}{B(l_i + 1, n_i - l_i + 1)} p^{l_i}(1-p)^{n_i - l_i}$$

after $n_l$ trials of option i of which $l_l$ elicited a non-zero response. To estimate the expected regret we take into account that for expected response rate $p_l$ and expected response value given a response $r_l$ the overall expected response value is $p_l r_l$. Hence the expected regret at stage t is:

$$R_t = \int_{0^k}^{1^k} \left[ \max_i \{r_i p_i\} - \sum_{j=1}^k n_j r_j p_j \right] \prod_{i=1}^k f_i(p_i) dp_1 \ldots dp_k \qquad (11)$$

Similarly changes are required in the formulae for the individual option contributions $R_{t,l}$. Hence, for example the final expression becomes $$R_{t,i} = \prod_{j \neq i} \mu_j[0, p_i^*] \left[ (t - n_i) r_i^* p_i^* - \sum_{j \neq i} n_j E_{\mu_j[0, p_i^*]}(r_j p_j) \right] \qquad (12)$$

Overestimating the Variance

For a fixed expected response value $r_l$ the distribution on the interval [0,1] with the highest variance is that which places the probability $r_l$ at 1 and probability 1-$r_l$ at 0. In this strategy we will replace the true responses by binary responses which mimic the same expected value but give response values of 0 or 1, hence over-estimating the variance.

To apply the method, the standard 0/1 response algorithm is run. If the true response is zero then this is passed as the response to the algorithm. When a non-zero response is elicited then we decide on-line whether to pass a 0 or 1 response to the algorithm as follows. We keep a current average response $s_l$ calculated from the true ordinal responses and the effective average response $\hat{s}_l$ of the 0/1 responses delivered to the algorithm. Note that these are the true averages, not the averages given that there is a response used in the previous section "Under-estimating the variance". If a non-zero response is elicited we recompute $s_l$. If it is now bigger than $\hat{s}_l$ we pass a 1 response to the algorithm, and otherwise pass a 0.

Hence at the end of each trial we have $\hat{s}_l \geq s_l$ and the difference between $s_l$ and $\hat{s}_l$ is always smaller than 1/t at trial t, while the variance of the responses passed to the standard algorithm is always higher than the actual variance of the true responses.

Extension of the Approach to the Multivariate Case—Binary Response Multivariate Campaign Configuration In the more general case there are independent variables which characterize the interaction scenario and which may be related to the response behaviour. These independent variables can be accommodated in the campaign optimization framework in the way described in this section. Consider a case where there are k content options, an input vector $x_{t,j} \in R^d$ per trial t and per option j, and with a single "true" weight vector w. (This includes the more general case with one weight vector for each option, since for this the weight and input vectors could be expanded appropriately.) We denote by $y_t \in \{0,1\}$ the success observed in trial t. Following the balanced cost-gain approach (of the basic campaign configuration) then we would like to balance the expected regrets (given the posterior distribution of the weights) of all options. The expected regret for option j is given by $$R_{t,i} = \int_{w_j = \text{argmax}_j w \cdot x_{t,j}} \sum_{\tau=1}^{t-1} \left[ \max_j w \square x_{\tau,j} - w \square x_{\tau, i(\tau)} \right] f_t(w) dw \qquad (13)$$

where i (τ) denotes the option in trial τ and $f_t$ (w) denotes the posterior on w at trial t. Thus $R_{t,l}$ denotes the expected regret under the assumption that option i is the best in the current trial, weighted with the probability that option i is indeed the best.

To balance the $R_{t,l}$ the algorithm would choose that option k with maximal $R_{t,l}$. This choice will not increase $R_{t,k}$ but will increase $R_{t,l}$ for all i≠k. The reason for balancing the $R_{t,l}$ is that the "best looking" option k, $R_{t,k}$ represents the estimated exploration costs so far, whereas for i≠k, $R_{t,l}$ represents the possible gains if i instead of k is the best option. Another intuition is that $$\sum_i R_{t,i}$$

denotes the total estimated regret so far. This expression is minimal or near-minimal if all $R_{t,l}$ are equal.

The drawback of this fully Bayesian approach is that the $R_{t,l}$ are computationally hard to calculate. Assuming a Gaussian prior, calculating $R_{t,l}$ amounts to the evaluation of a Gaussian in high-dimensional "cones" which are bounded by hyperplanes. A convenient approximation similar to the approximation used for the basic campaign configuration case can be made. Assume that we have a Gaussian posterior $f_t(w) = n(w | \mu_t, \Sigma_t)$. By projecting the Gaussian onto the line spanned by the input $x_{t,l}$ we get a one-dimensional Gaussian $$f_{t,i}(p_i) = n(p_i | \mu_t \square x_{t,i} x^1_{t,i} \Sigma_t x_{t,i}) \qquad (14)$$

on the success probability of option i. Fixing the best mean $$p^*_j = \max \mu_j \square x_{t,j} \qquad (15)$$

we can now apply a cost-gain approach as for the basic campaign configuration. Let $COST_t$ be the exploration costs so far and let $$GAIN_{t,i} = t \int_{p_t^*}^{\infty} [p_i - p_t^*] f_{t,i}(p_i) dp_i \qquad (16)$$

be the possible gain of option i over the currently best option. Now choose the option whose gain exceeds $COST_t$ by the greatest amount. If no option's gain exceeds the costs then choose the currently best option. A good estimate of $COST_t$ can be calculated as $$COST_t = \sum_{\tau=1}^{t-1} [p_\tau^* - y_\tau] \qquad (17)$$

from the differences between the success probabilities of the best options and the actually observed successes. This leaves the problem of calculating the Gaussian posterior on w. Ideally we would like to use the maximum likelihood estimate for w as the mean and the Hessian of the log-likelihood as the inverse of the covariance matrix. In our model the likelihood at trial t is $$l_t(w) = f(w)\prod_{\tau=1}^{t-1} (w \Box x_{\tau,i(\tau)})^{y_\tau} (1 - w \Box x_{\tau,i(\tau)})^{1-y_\tau} \quad (18)$$

where f (w) is an appropriate prior. We get $$\frac{\partial \log l_t(w)}{\partial w} = \frac{\partial \log f(w)}{\partial w} + \sum_{\tau=1}^{t-1} \left[ y_\tau \frac{x'_{\tau,i(\tau)}}{(w \Box x_{\tau,i(\tau)})} + (1-y_\tau) \frac{x'_{\tau,i(\tau)}}{(1-w \Box x_{\tau,i(\tau)})} \right] \quad (19)$$

and $$\frac{\partial^2 \log l_t(w)}{\partial w^2} = \quad (20)$$

$$\frac{\partial^2 \log f(w)}{\partial w^2} - \sum_{\tau=1}^{t-1} \left[ y_\tau \frac{x_{\tau,i(\tau)} \Box x'_{\tau,i(\tau)}}{(w \Box x_{\tau,i(\tau)})^2} + (1-y_\tau) \frac{x_{\tau,i(\tau)} \Box x'_{\tau,i(\tau)}}{(1-w \Box x_{\tau,i(\tau)})^2} \right]$$

Calculating the ML-estimate for w from (19) is computationally hard, Instead it is easier to use a Gaussian approximation $l$ to $l$.

$$\bar{l}_t(w) \propto f(w) \prod_{\tau=1}^{t-1} \exp\{-(w \Box x_{\tau,i(\tau)} - y_\tau)^2/(2\sigma^2)\} \quad (21)$$

and choose $$f(w) \propto \text{exct} \{-w \Box w'/(2\sigma^2)\} \quad (22)$$

we get as the ML-estimate $\hat{w}$ for w the solution of the least square regression problem $$\min w \Box w' + \sum_{\tau=1}^{t-1} (w \Box x_{\tau,i(\tau)} - y_\tau)^2 \quad (23)$$

which is easy to compute. From (21) we can also calculate the covariance matrix as the inverse of $$\frac{1}{\sigma^2}\left(I + \sum_{\tau=1}^{t-1} (x_{\tau,i(\tau)} \Box x'_{\tau,i(\tau)})\right) \quad (24)$$

where I denotes the identity matrix. (Setting $\sigma^2=1$ has proven to be safe in this application.) Instead we could use (20) to calculate an estimate for the inverse of the covariance matrix $$\sum^{-1} = \quad (25)$$

$$I + \sum_{\tau=1}^{t-1} \left[ y_\tau x_{\tau,i(\tau)} \Box \frac{x'_{\tau,i(\tau)}}{(\hat{w} \Box x_{\tau,i(\tau)})^2} + (1-y_\tau) x_{\tau,i(\tau)} \Box \frac{x'_{\tau,i(\tau)}}{(1-\hat{w} \Box x_{\tau,i(\tau)})^2} \right]$$

Here care may be necessary if $(\hat{w} \Box x_{\tau,I(\tau)}) \notin (0,1)$.

Ordinal Response Multivariate Campaign Configuration

As for the basic campaign configuration we use one of two alternative methods of handling ordinal responses. There is, however, a difference in this approach, as it will not be possible to apply the "maximizing the variance" method in the multivariate case. This is because that approach relies on delaying the response for a particular option until its cumulative response exceeds some threshold. For the multivariate case we cannot ascribe a response to a particular option since it is the result of the fit between the weight vector and the feature input vector. Hence it should be apportioned to weight vectors that favour that input vector. If we delay the response the particular configuration is unlikely to occur again and so the response will never be delivered.

Method 1. Estimating the Expected Response.

In this approach we use the weight vector to model the expected response rather than the probability of a (binary) response. Since the derivations for the expected regret given above do not rely on the response being binary, we can use exactly the same derivations, simply replacing the binary $y_t$ in the equations for the COST$_t$. The equations (19) and (20) no longer make sense as methods for updating the distribution, but moving straight to the Gaussian approximation in equation (21) provides a natural interpretation of the method as ridge regression to the (non-binary) estimates $y_t$ with the covariance matrix given by equation (24). Importantly both of these are readily computable in a kernel defined feature space.

Method 2. Separating the Probability of Response from Size of Reward

This method uses the multivariate model to predict the probability of a response as in the binary case. Hence the $y_t$ are not the actual response values but are set to 1 if a response is obtained and 0 otherwise. Hence the updating of the distributions and so on is identical to that given above for the multivariate case. However, we keep an estimate of the expected response $r_l$ for a particular option l given that there is some response for that option. Now the estimate for the expected regret $R_{t,l}$ becomes $$R_{t,i} = \int_{w:i=\text{argmax}_j r_j w \Box x_{t,j}} \sum_{\tau=1}^{t-1} \left[ \max_j r_j w \Box x_{\tau,j} - r_{i(\tau)} w \Box x_{\tau,i(\tau)} \right] f_t(w) dw \quad (26)$$

Similarly, the expressions for GAINT$_{t,l}$ and COST$_t$ become $$GAIN_{t,i} = t\int_{p_t^*}^{\infty} [r_i p_t - r_i \cdot p_t^*] f_{t,i}(p_i) dp_i \quad (27)$$

and $$COST_t = \sum_{\tau=1}^{t-1} r_{i(\tau)} [p_\tau^* - y_\tau] \quad (28)$$

and

The general approach described above to optimise a campaign with a number of discrete options either in a basic configuration or a muiltivariate configuration will be referred to as the "Cost-Gain" approach in future references.

The invention claimed is:

1. A method of controlling a system to optimize an objective function thereof, the system performing a plurality of candidate actions and monitoring response performances of a performance of a respective candidate action, where the objective function is a function of the monitored response performances following decisions and actions taken, the method comprising the steps of:
   a) monitoring response performance of a respective candidate action that is chosen to be performed by the system;
   b) storing, according to the candidate action performed by the system, a representation of said monitored response performance;
   c) calculating the expected growth in regret associated with each of the plurality of candidate actions, assessed using a probability distribution based on the historical response performances to date of said plurality of candidate actions, where the expected growth in regret is a system performance measure that is calculated to represent the trade-off between the relative merit of exploration of one or more apparently non-best candidate actions to mitigate the risk of ignoring one of said one or more apparently non-best candidate actions which may actually be the current best candidate action, with respect to the relative merit of exploiting what appears to be the current best candidate action but which in fact may not be the current best candidate action, based on said historical response performances to date;
   d) choosing as the next action the candidate action that is calculated to result in the lowest expected growth in regret after the chosen candidate action is performed by the system;
   e) commanding the system to perform the chosen next action; and
   f) repeating steps a) to e) to control the system so as to substantially optimize the objective function of the system.

2. A method according to claim 1 wherein step c) includes assessing which candidate action is likely to result in the lowest expected growth in regret on the basis of a true best candidate action which has the mean of said probability distribution.

3. A method according to claim 1 wherein step c) includes evaluating the cost or losses associated with presenting a lower performing candidate action and the gain or benefit associated with knowing the true position of the current best observed candidate action on said probability distribution.

4. A method according to claim 3 wherein step c) includes assessing which candidate action is likely to result in the lowest expected growth in regret according to an assumption that the current best observed candidate action is assumed to have zero uncertainty around its mean or expected response performance.

5. A method according to claim 1 wherein step c) includes assessing which candidate action is likely to result in the lowest expected growth in regret according to an assumption of a Student's distribution and evaluation of Student's t parameters as the basis for estimating probabilities of unequal or equal response states between the candidate action with the current expected best response performance and any other candidate action.

6. A method according to claim 1 wherein step c) includes using a Monte Carlo algorithm to provide understanding of the probability distribution of the response performance of all of the plurality of candidate actions and either choosing the candidate action that if not taken would contribute most to an expected regret estimate, or choosing a candidate action with probability proportional to its contribution to the expected regret estimate if not taken.

7. A method according to claim 1 further comprising the step of:
   g) applying a temporal depreciation factor to the stored representations of the response performance in order to depreciate the significance of the stored representations over time.

8. A method according to claim 7 wherein step g) includes applying, for each candidate action, a different temporal depreciation factor to the stored representations of the response performance thereof.

9. A method according to claim 1 further comprising the step of:
   g) forcing the performance of each candidate action a minimum number of times or at a minimum rate.

10. A method according to claim 1 wherein the monitored response performance of a respective candidate action in step a) is stored in step b) in a form to enable sharing of the stored representation of said monitored response performance with another system.

11. A method according to claim 1 wherein the representation of said monitored response performance contains at least one variable that characterizes the conditions under which the candidate action was performed.

12. A system having means for performing a plurality of candidate actions and means for monitoring response performances of a performance of a respective candidate action during performance of an objective function of the system, where the objective function is a function of the monitored response performances following decisions and actions taken, the system further having a control apparatus that is programmed to control the objective function of the system by performing the method comprising the steps of:
   a) monitoring response performance of a respective candidate action that is chosen to be performed by the system;
   b) storing, according to the candidate action performed by the system, a representation of said monitored response performance;
   c) calculating the expected growth in regret associated with each of the plurality of candidate actions, assessed using a probability distribution based on the historical response performances to date of said plurality of candidate actions, where the expected growth in regret is a system performance measure that is calculated to represent the trade-off between the relative merit of exploration of one or more apparently non-best candidate actions to mitigate the risk of ignoring one of said one or more apparently non-best candidate actions which may actually be the current best candidate action, with respect to the relative merit of exploiting what appears to be the current best candidate action but which in fact may not be the current best candidate action, based on said historical response performances to date;
   d) choosing as the next action the candidate action that is calculated to result in the lowest expected growth in regret after the chosen candidate action is performed;
   e) commanding the system to perform the chosen next action; and
   f) repeating steps a) to e) to control the system so as to substantially optimize the objective function of the system.

13. A robot comprising the system according to claim 12, where the control apparatus of the system controls the objective function of the robot so as to optimize the objective function of the robot.

14. A control apparatus for controlling a system to optimize an objective function thereof, the system performing a plurality of candidate actions and monitoring response performances of a performance of a respective candidate action, where the objective function is a function of the monitored response performances following decisions and actions taken, the control apparatus comprising
   a) means for monitoring response performance of a respective candidate action that is chosen to be performed by the system;
   b) means for storing, according to the candidate action performed by the system, a representation of said monitored response performance;
   c) means for calculating the expected growth in regret associated with each of the plurality of candidate actions, assessed using a probability distribution based on the historical response performances to date of said plurality of candidate actions, where the expected growth in regret is a system performance measure that is calculated to represent the trade-off between the relative merit of exploration of one or more apparently non-best candidate actions to mitigate the risk of ignoring one of said one or more apparently non-best candidate actions which may actually be the current best candidate action, with respect to the relative merit of exploiting what appears to be the current best candidate action but which in fact may not be the current best candidate action, based on said historical response performances to date;
   d) means for choosing as the next action the candidate actions that is calculated to result in the lowest expected growth in regret after the chosen candidate action is performed by the system; and
   e) means for commanding the system to perform the chosen next action,
   wherein the control apparatus controls the system so as to substantially optimize the objective function of the system.

15. A method of controlling a system with two or more subsystems to optimize an objective function of the system, the system performing a plurality of candidate actions, wherein a candidate action is represented by the selection of a lower level subsystem from said two or more subsystems, and wherein the system monitors the response performance of the selected subsystem, where the objective function is a function of the monitored response performances following decisions and actions taken, the method comprising the steps of:
   a) monitoring response performance of a respective candidate action that is chosen to be performed by the system;
   b) storing, according to the candidate action performed by the system, a representation of said monitored subsystem performance in response to the candidate action;
   c) calculating the expected growth in regret associated with each of the plurality of candidate actions, assessed using a probability distribution based on the historical response performances to date of said plurality of candidate actions, where the expected growth in regret is a system performance measure that is calculated to represent the trade-off between the relative merit of exploration of one or more apparently non-best candidate actions to mitigate the risk of ignoring one of said one or more apparently non-best candidate actions which may actually be the current best candidate action, with respect to the relative merit of exploiting what appears to be the current best candidate action but which in fact may not be the current best candidate action, based on said historical response performances to date;
   d) choosing as the next action the candidate action that is calculated to result in the lowest expected growth in regret after the chosen candidate action is performed by the system;
   e) commanding the system to perform the chosen next action using a corresponding lower level subsystem; and
   f) repeating steps a) to e) to control the system so as to substantially optimize the objective function of the system.

* * * * *